(12) United States Patent
Park

(10) Patent No.: US 10,234,951 B2
(45) Date of Patent: Mar. 19, 2019

(54) METHOD FOR TRANSMITTING/RECEIVING MESSAGE AND ELECTRONIC DEVICE THEREOF

(71) Applicant: Samsung Electronics Co., Ltd., Suwon-si, Gyeonggi-do (KR)

(72) Inventor: Hyung-Jin Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 13/908,222

(22) Filed: Jun. 3, 2013

(65) Prior Publication Data

US 2014/0053082 A1 Feb. 20, 2014

(30) Foreign Application Priority Data

Aug. 16, 2012 (KR) .................. 10-2012-0089710

(51) Int. Cl.
| | |
|---|---|
| *G06F 3/048* | (2013.01) |
| *G06F 3/01* | (2006.01) |
| *H04L 12/58* | (2006.01) |
| *H04M 1/725* | (2006.01) |

(52) U.S. Cl.
CPC ............. *G06F 3/017* (2013.01); *H04L 51/22* (2013.01); *H04M 1/72547* (2013.01); *H04L 51/38* (2013.01)

(58) Field of Classification Search
CPC ...................................................... G06F 3/017
USPC ........................................................ 715/753
See application file for complete search history.

(56) References Cited

U.S. PATENT DOCUMENTS

| | | | | |
|---|---|---|---|---|
| 5,712,995 | A * | 1/1998 | Cohn | G06F 3/0481 715/792 |
| 6,073,036 | A * | 6/2000 | Heikkinen et al. | 455/550.1 |
| 7,484,182 | B1 * | 1/2009 | Smith | 715/794 |
| 7,552,177 | B2 * | 6/2009 | Kessen et al. | 709/206 |
| 7,770,136 | B2 * | 8/2010 | Beeck et al. | 715/863 |
| 2002/0130904 | A1 | 9/2002 | Becker et al. | |
| 2006/0026535 | A1* | 2/2006 | Hotelling et al. | 715/863 |
| 2007/0288560 | A1* | 12/2007 | Bou-Ghannam | G06Q 10/107 709/204 |
| 2008/0168401 | A1* | 7/2008 | Boule | G06F 3/04883 715/863 |
| 2010/0020025 | A1* | 1/2010 | Lemort | G06F 3/04883 345/173 |

(Continued)

FOREIGN PATENT DOCUMENTS

| | | |
|---|---|---|
| CN | 101645960 A | 2/2010 |
| CN | 102138126 A | 7/2011 |

(Continued)

OTHER PUBLICATIONS

Korean Office Action with English translation dated Nov. 8, 2018; Korean Appln. No. 10-2012-0089710.

*Primary Examiner* — Matthew Ell
*Assistant Examiner* — Mohamed Abou El Seoud
(74) *Attorney, Agent, or Firm* — Jefferson IP Law, LLP

(57) ABSTRACT

An apparatus and a method for transmitting/receiving a message in an electronic device are provided. The method includes displaying a plurality of dialog windows are displayed, receiving a message via an input window, selecting at least one dialog window among the plurality of dialog windows, and transmitting the message to at least one of the plurality of dialog windows.

8 Claims, 28 Drawing Sheets

(56) References Cited

U.S. PATENT DOCUMENTS

| | | | |
|---|---|---|---|
| 2010/0035658 A1* | 2/2010 | Lee | H04M 1/27455 455/566 |
| 2010/0125801 A1* | 5/2010 | Shin | G06F 1/1616 715/758 |
| 2010/0203908 A1 | 8/2010 | Jeong et al. | |
| 2010/0231612 A1* | 9/2010 | Chaudhri | G06F 3/04886 345/684 |
| 2013/0218987 A1* | 8/2013 | Chudge | G06Q 10/10 709/206 |
| 2013/0263013 A1* | 10/2013 | Jiang | G06F 3/04883 715/752 |
| 2014/0173456 A1 | 6/2014 | Moudy et al. | |

FOREIGN PATENT DOCUMENTS

| | | |
|---|---|---|
| EP | 2 151 980 A1 | 2/2010 |
| KR | 10-2010-0054369 A | 5/2010 |
| KR | 10-2010-0091045 A | 8/2010 |
| KR | 10-2012-0030266 A | 3/2012 |

\* cited by examiner

METHOD FOR TRANSMITTING/RECEIVING MESSAGE AND ELECTRONIC DEVICE THEREOF

PRIORITY

This application claims the benefit under 35 U.S.C. § 119(a) of a Korean patent application filed on Aug. 16, 2012 in the Korean Intellectual Property Office and assigned Serial No. 10-2012-0089710, the entire disclosure of which is hereby incorporated by reference.

BACKGROUND OF THE INVENTION

1. Field of the Invention

The present invention relates to a method for transmitting/receiving a message and an electronic device thereof.

2. Description of the Related Art

Electronic devices are becoming a necessity of modern life due to easy portability. Especially, multimedia devices typically provide various services such as voice and video communication functions, an information input/output function, a data storage service, a photographing service, an e-mail service, and a message service. The message service includes at least one of a Short Message Service (SMS), a Multimedia Messaging System (MMS), an instant message service, and a messenger service.

The message service using data communication among the various services of the electronic device transmits text or an attached file, etc. input from an electronic device user to a counterpart user. Accordingly, the electronic device user may perform communication with a counterpart user using a method besides telephone communication.

As described above, the message service is an important service to electronic device users, and has an advantage of allowing an electronic device user to transfer his opinion using the message service without performing telephone communication.

As described above, as users using the message service increase, service providers provide various message programs. Accordingly, an electronic device user desires a convenient user interface to easily use various message programs.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for transmitting/receiving a message in an electronic device having a touchscreen.

Another aspect of the present invention is to provide an apparatus and a method for displaying a plurality of dialog windows in an electronic device.

Another aspect of the present invention is to provide an apparatus and a method for displaying dialog windows of different message programs in an electronic device.

Another aspect of the present invention is to provide an apparatus and a method for transmitting a message input to an input window to at least one dialog window in an electronic device displaying a plurality of dialog windows.

In accordance with an aspect of the present invention, a method for transmitting/receiving a message in an electronic device is provided. The method includes displaying a plurality of dialog windows, receiving a message via an input window, selecting at least one dialog window among the plurality of dialog windows, and transmitting the message to at least one of the plurality of dialog windows.

In accordance with another aspect of the present invention, an apparatus for transmitting/receiving a message is provided. The apparatus includes at least one processor, a memory, and at least one program stored in the memory and configured for being executable by the at least one processor, wherein the program includes at least one instruction which, when executed by the processor, causes the processor to perform a method including displaying a plurality of dialog windows on the touchscreen, receiving a message via an input window displayed on the touchscreen, selecting at least one dialog window among the plurality of dialog windows, and transmitting the message to one of the plurality of dialog windows.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a technology for providing a message service using a plurality of dialog windows in an electronic device.

In the following description, the electronic device having a touchscreen may include a mobile communication terminal, a Personal Digital Assistant (PDA), a laptop computer, a smart phone, a netbook, a television, a Mobile Internet Device (MID), a Ultra Mobile Personal Computer (UMPC), a tablet PC, a navigation, and an MP3 player that provide data communication.

Figure 1:
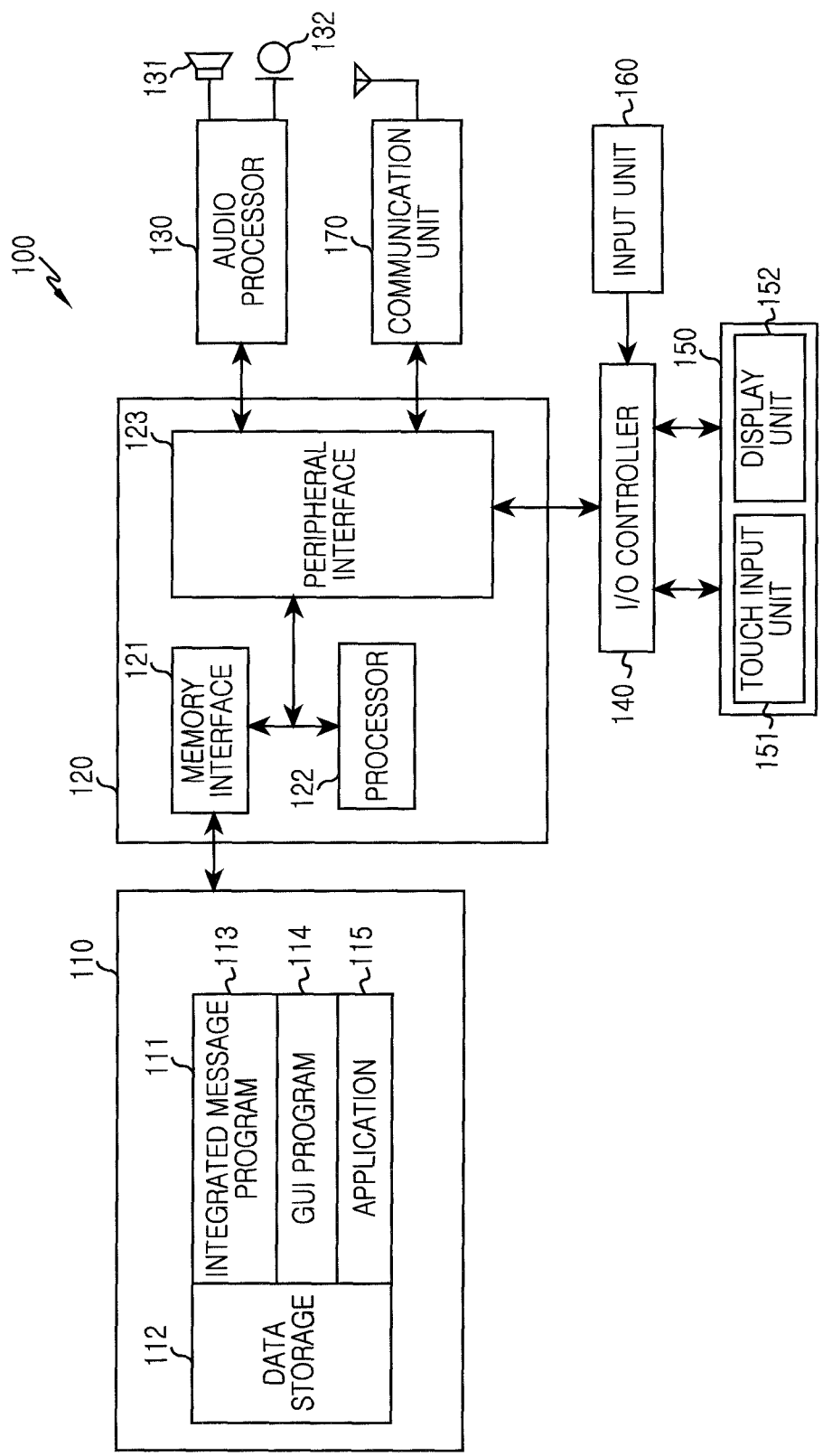
FIG. 1 is a block diagram illustrating an electronic device according to an exemplary embodiment of the present invention.

FIG. 1 is a block diagram illustrating an electronic device according to an exemplary embodiment of the present invention.

Referring to FIG. 1, the electronic device 100 includes a memory 110, a processor unit 120, an audio processor 130, an Input/Output (I/O) controller 140, a touchscreen 150, an input unit 160, and a communication unit 170. A plurality of memories 110 may be provided.

The memory 110 includes a program storage 111 for storing a program controlling an operation of the electronic device 100, and a data storage 112 for storing data generated during execution of a program. For example, the program storage 111 includes an integrated message program 113, a Graphic User Interface (GUI) program 114, and at least one application 115. A program included in the program storage 111 is a set of instructions, and may be expressed as an instruction set.

The integrated message program 113 includes at least one software element for controlling to display a plurality of dialog windows. For example, when providing a message service using a first dialog window, the integrated message program 113 controls to display the first dialog window. When receiving a message via a second dialog window while providing a message service using the first dialog window, the integrated message program 113 controls to reduce the first dialog window and display the first dialog window and the second dialog window. Also, when the second dialog window is activated while providing the message service using the first dialog window, the integrated message program 113 may control to reduce the first dialog window and display the first dialog window and the second dialog window. When the second dialog window is activated by a user's voice instruction while providing the message service using the first dialog window, the integrated message program 113 may control to reduce the first dialog window and display the first dialog window and the second dialog window.

Additionally, when displaying a plurality of dialog windows, the integrated message program 113 may control to magnify and display at least one dialog window. Also, the integrated message program 113 may control to reduce and display at least one dialog window. The integrated message program 113 may also control to change a dialog window with consideration of a gesture for a plurality of dialog windows. The integrated message program 113 may control to magnify, reduce, and/or change at least one dialog window among a plurality of dialog windows depending on a user's voice instruction.

The integrated message program 113 includes at least one software element for controlling to transmit a message input to an input window to at least one dialog window. For example, when displaying a plurality of dialog windows, the integrated message program 113 determines at least one dialog window to which the integrated message program 113 will transmit a message input to an input window with consideration of a message transmission event. The integrated message program 113 controls to transmit the message input to an input window to at least one dialog window. The message transmission event includes movement information, touch information, the number of button inputs, a button input duration time, and a voice instruction, etc. of the electronic device.

When the integrated message program 113 transmits a message to a dialog window, it is understood that the message is also transmitted to a contact corresponding to the dialog window. Thus, the message is displayed on the dialog window of the touchscreen and transmitted to the corresponding contact via the communication unit 170. Thus, references to "transmitting a message to a dialog window" should be understood as also including the corresponding operation of transmitting the message to the corresponding contact via the communication unit 170.

The Graphic User Interface (GUI) program 114 includes at least one software element for providing a user interface using graphics on a display unit 152. For example, the GUI program 114 controls to display the first dialog window via the integrated message program 113. The GUI program 114 controls to reduce the first dialog window and display the first dialog window and the second dialog window via the integrated message program 113. For example, the GUI program 114 may control to magnify and display at least one dialog window via the integrated message program 113. The GUI program 114 may control to reduce and display at least one dialog window via the integrated message program 113. The GUI program 114 may control to display a message input to an input window and a message transmitted to at least one dialog window via the integrated message program 113.

The application 115 includes a software element for at least one application installed in the electronic device 100.

The processor unit 120 includes a memory interface 121, at least one processor 122, and a peripheral interface 123. The memory interface 121, the at least one processor 122, and the peripheral interface 123 included in the processor unit 120 may be integrated in at least one Integrated Circuit (IC) or may be implemented as separate elements.

The memory interface 121 controls an access of an element such as the processor 122 and the peripheral interface 123, to the memory 110.

The peripheral interface 123 controls the connection between an I/O peripheral unit of the electronic device, the processor 122, and the memory interface 121.

Figure 2:
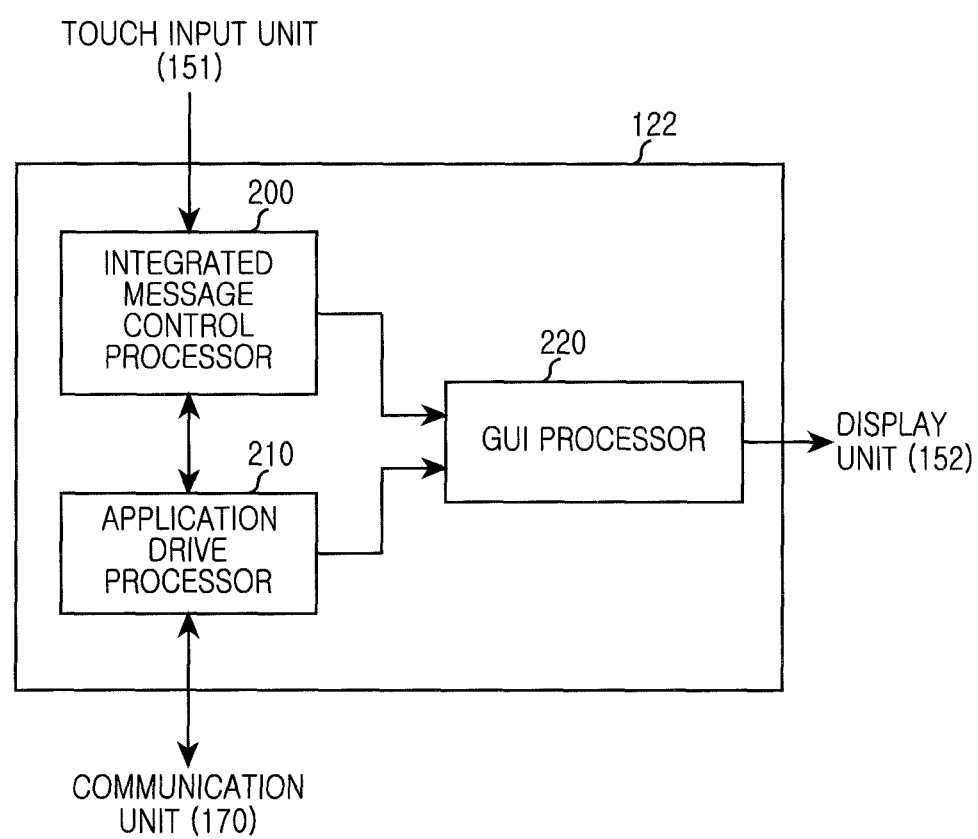
FIG. 2 is a block diagram illustrating a processor in detail according to an exemplary embodiment of the present invention.

The processor 122 controls the electronic device 100 to provide various multimedia services using at least one software program. The processor 122 executes at least one program stored in the memory 110 to control to provide a service according to a relevant program. For example, the processor 122 may be configured as illustrated in FIG. 2 in order to execute the integrated message program 113 to display a plurality of dialog windows, and then transmit a message input to an input window to at least one dialog window.

The audio processor 130 provides an audio interface between a user and the electronic device 100 via a speaker 131 and a microphone 132.

The I/O controller 140 provides an interface between an I/O unit such as the display unit 152 and the input unit 160 and the peripheral interface 124.

The touchscreen 150 includes a touch input unit 151 and the display unit 152 as I/O units performing output/input of information.

The touch input unit 151 provides touch information sensed via a touch panel to the processor unit 120 via the I/O controller 140. The touch input unit 151 provides touch information by an electronic pen or a finger to the processor unit 120 via the I/O controller 140.

The display unit 152 displays state information of the electronic device 100, a letter input by the user, a moving picture, a still picture, etc. For example, the display unit 152 displays a first dialog window via the GUI program 114, and reduces the first dialog window to display the first dialog window and the second dialog window. The display unit 152 may magnify and display at least one dialog window via the GUI program 114. The display unit 152 may reduce and display at least one dialog window via the GUI program 114. The display unit 152 may display a plurality of dialog windows and then display a message input to an input window and a message transmitted to at least one dialog window via the GUI program 114.

The input unit 160 provides input data generated by a user's selection to the processor unit 120 via the I/O controller 140. For example, the input unit 160 may include only a control button for controlling the electronic device 100. The input unit 160 may also include a keypad for receiving input data from the user.

The communication unit 170 includes at least one software element for performing a communication function for voice communication and data communication. The communication unit 170 may be divided into a plurality of communication submodules supporting different communication networks. For example, although not limited thereto, the communication network includes a Global System for Mobile Communication (GSM) network, an Enhanced Data GSM Environment (EDGE) network, a Code Division Multiple Access (CDMA) network, a Wide-CDMA (W-CDMA) network, a Long Term Evolution (LTE) network, an Orthogonal Frequency Division Multiple Access (OFDMA) network, a wireless LAN, a Bluetooth network, and a Near Field Communication (NFC) network.

FIG. 2 is a block diagram illustrating a processor according to an exemplary embodiment of the present invention.

Referring to FIG. 2, the processor 122 includes an integrated message control processor 200, an application drive processor 210, and a GUI processor 220.

The integrated message control processor 200 executes the integrated message program 113 of the program storage 111 to control to display a plurality of dialog windows. For example, when providing a message service using a first dialog window, the integrated message control processor 200 controls to display the first dialog window. When receiving a message via a second dialog window while providing the message service using the first dialog window, the integrated message control processor 200 controls to reduce the first dialog window and display the first dialog window and the second dialog window. When the second dialog window is activated by a user's manipulation while providing the message service using the first dialog window, the integrated message control processor 200 may control to reduce the first dialog window and display the first dialog window and the second dialog window. When the second dialog window is activated by a user's voice instruction while providing the message service using the first dialog window, the integrated message control processor 200 may control to reduce the first dialog window and display the first dialog window and the second dialog window.

Additionally, when displaying a plurality of dialog windows, the integrated message control processor 200 may control to magnify and display at least one dialog window. Also, the integrated message control processor 200 may control to reduce and display at least one dialog window. The integrated message control processor 200 may control to change a dialog window with consideration of a gesture for a plurality of dialog windows. The integrated message control processor 200 may control to magnify, reduce, and change at least one dialog window among a plurality of dialog windows depending on the user's voice instruction.

Additionally, the integrated message control processor 200 may include at least one software element for controlling to transmit a message input to an input window to at least one dialog window. For example, when displaying a plurality of dialog windows, the integrated message control processor 200 determines at least one dialog window to which the integrated message control processor 200 will transmit a message input to an input window with consideration of a message transmission event. The integrated message control processor 200 controls to transmit the message input to an input window to the at least one dialog window. The message transmission event includes movement information, touch information, the number of button inputs, a button input duration time, and a voice instruction of the electronic device.

The application drive processor 210 executes an application 115 of the program storage 111 to provide the application for transmitting and receiving a message. For example, when the integrated message control processor 200 transmits a message to at least one dialog window among a plurality of dialog windows, the application drive processor 210 controls to transmit the message via a message application corresponding to the at least one dialog window.

The GUI processor 220 executes the GUI program 114 of the program storage 111 to provide a user interface on the display unit 152. For example, the GUI processor 220 controls to display the first dialog window via the integrated message control processor 200. The GUI processor 220 controls to reduce the first dialog window and display the first dialog window and the second dialog window via the integrated message control processor 200. The GUI processor 220 may control to magnify and display at least one dialog window via the integrated message control processor 200. The GUI processor 220 may control to reduce and display at least one dialog window via the integrated message control processor 200. The GUI processor 220 may control to display a message input to an input window and a message transmitted to at least one dialog window via the integrated message control processor 200.

In the above exemplary embodiment of the present invention, the electronic device displays a plurality of dialog windows, and then transmits a message input to an input window to at least one dialog window. The electronic device may determine whether to use a plurality of dialog windows in order to use the plurality of dialog windows. For example, the electronic device may determine whether an icon for displaying the plurality of dialog windows is selected. The electronic device may determine whether an event for displaying the plurality of dialog windows occurs with consideration of input information of a hardware button. The electronic device may determine whether an event for displaying the plurality of dialog windows occurs with consideration of input information of a hardware button and movement information of the electronic device. The electronic device may determine whether an event for displaying the plurality of dialog windows occurs with consideration of touch information for the touchscreen. The electronic device may determine whether an event for displaying the plurality of dialog windows occurs with consideration of the touch information for the touchscreen and movement information of the electronic device. The electronic device may determine whether an event for displaying the plurality of dialog windows occurs depending on a user's voice instruction.

In the above exemplary embodiment of the present invention, after displaying the plurality of dialog windows, the electronic device may execute the integrated message control processor 200 including the integrated message program 113 in order to transmit/receive a message.

According to another exemplary embodiment of the present invention, the electronic device may include a separate integrated message processor including the integrated message program 113.

Figure 3A:
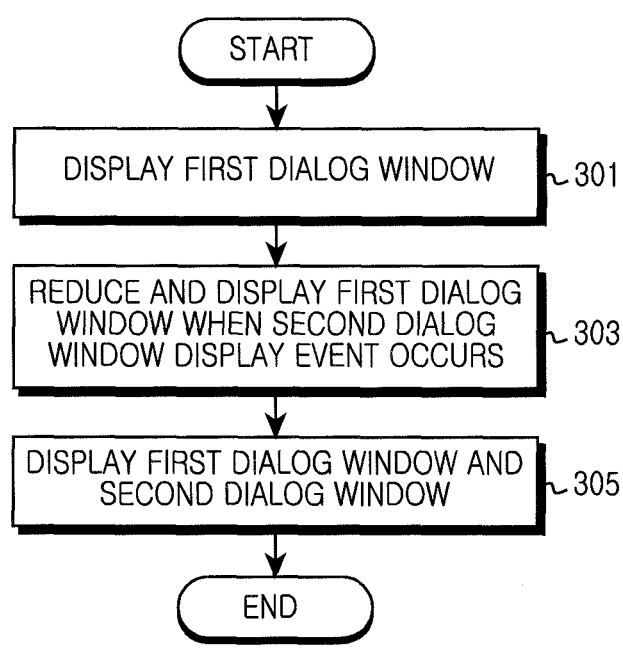
FIG. 3A is a flowchart illustrating a procedure for displaying a plurality of dialog windows in an electronic device according to an exemplary embodiment of the present invention.
Figure 5A:
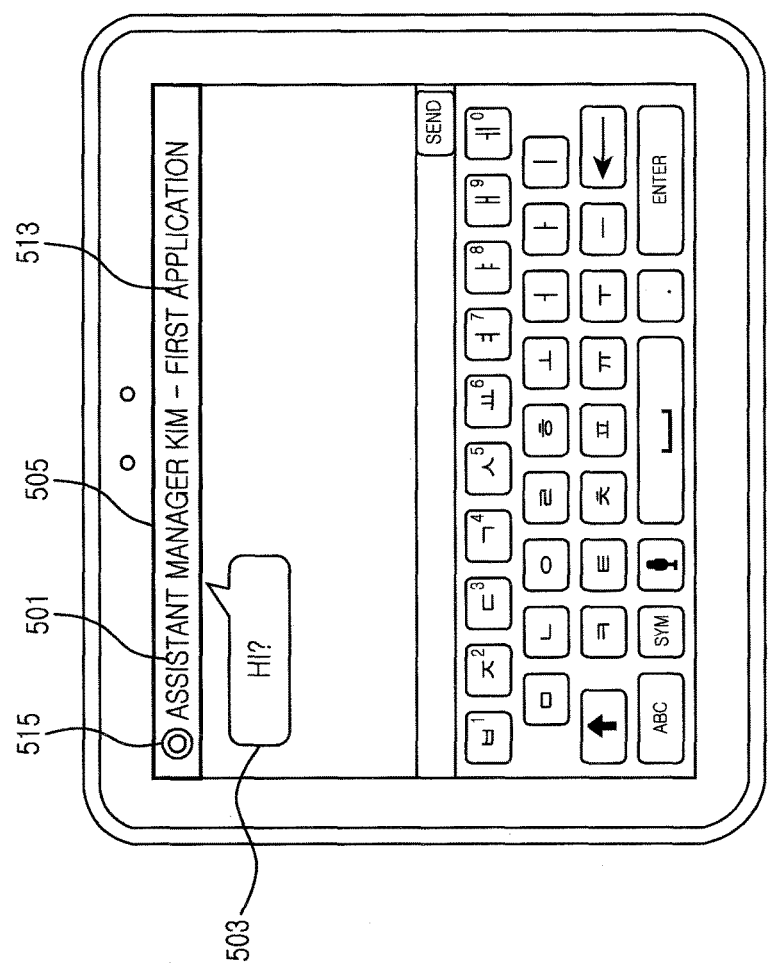
FIGS. 5A and 5B are views illustrating a screen configuration for displaying a plurality of dialog windows in an electronic device according to an exemplary embodiment of the present invention.
Figure 5B:
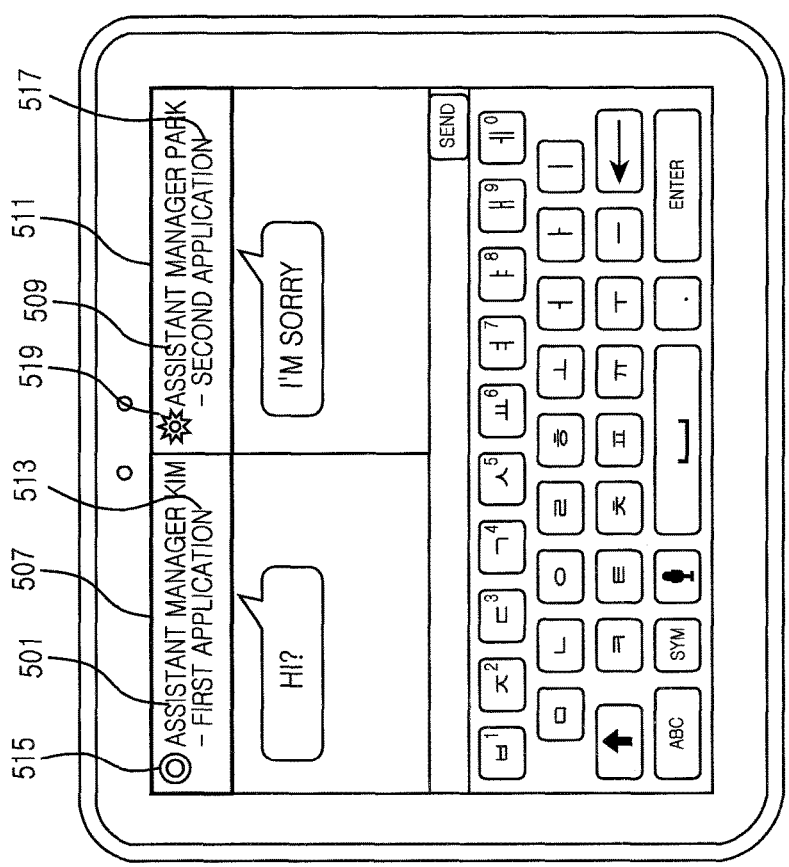

FIG. 3A illustrates a procedure for displaying a plurality of dialog windows in an electronic device according to an exemplary embodiment of the present invention. FIGS. 5A and 5B are views illustrating a screen configuration for displaying a plurality of dialog windows in an electronic device according to an exemplary embodiment of the present invention. FIGS. 6A to 6E are views illustrating a screen configuration for adding a dialog window in an electronic device according to an exemplary embodiment of the present invention.

Referring to FIG. 3A, FIGS. 5A and 5B, and FIGS. 6A-6E, the electronic device displays a first dialog window in step 301. For example, when detecting reception of a message from "assistant manager KIM" via the communication unit 170, the electronic device displays a dialog window 505 of "assistant manager KIM" 501 on the display unit 152 as illustrated in FIG. 5A. The electronic device displays the message 503 received from "assistant manager KIM" 501 on the display unit 152. Additionally, the electronic device may display a name 513 and an application icon 515 of an application that has received the message 503 from "assistant manager KIM" 501. When executing the dialog window of "assistant manager KIM" according to a user's voice instruction, the electronic device may display the dialog window 505 of "assistant manager KIM" 501 on the display unit 152 as illustrated in FIG. 5A.

Figure 6A:
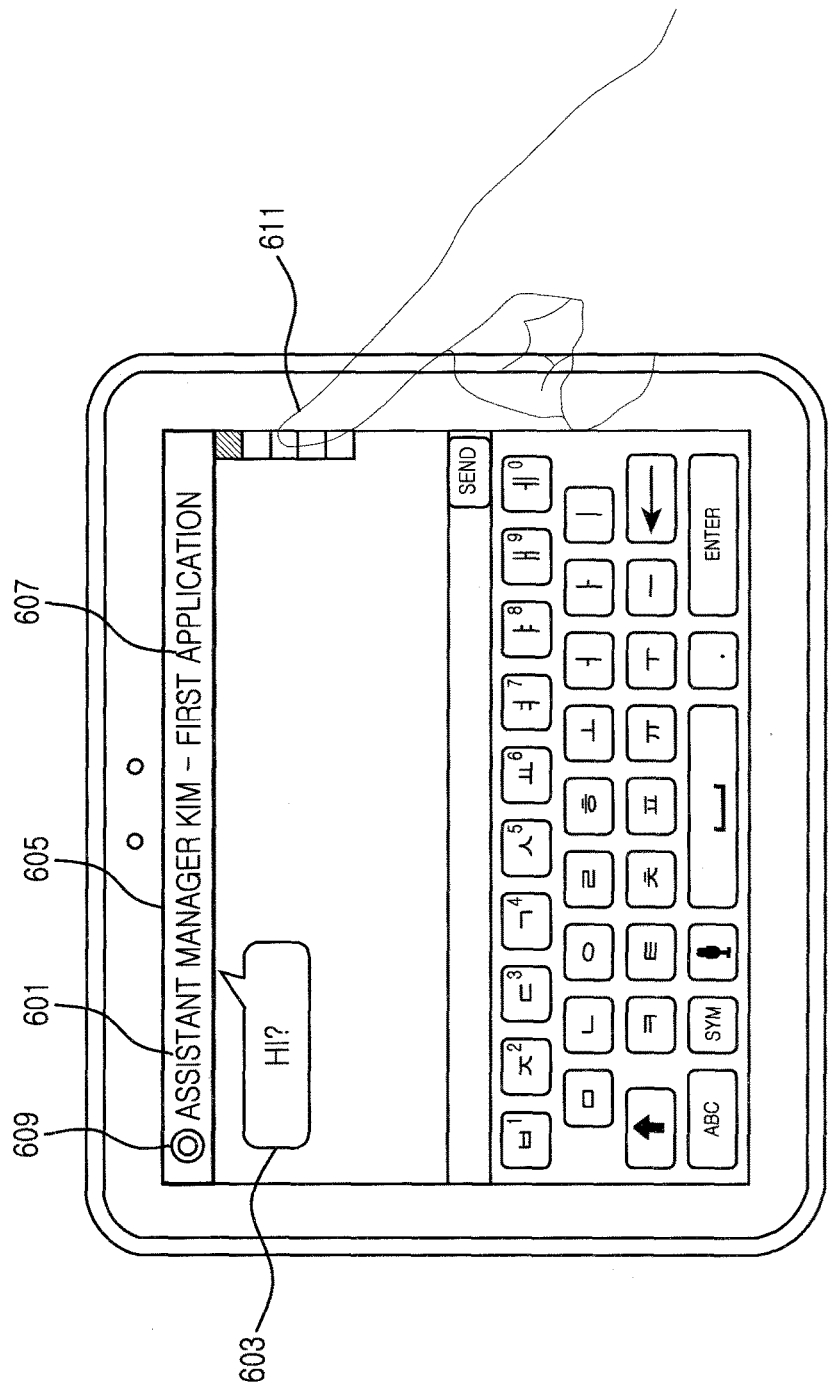
FIGS. 6A to 6E are views illustrating a screen configuration for adding a dialog window in an electronic device according to an exemplary embodiment of the present invention.

When a menu for executing the dialog window of "assistant manager KIM" is selected by a user's manipulation, the electronic device may display a dialog window 605 of "assistant manager KIM" 601 on the display unit 152 as illustrated in FIG. 6A. The electronic device may display "assistant manager KIM" 601 and a message 603 transmitted/received last on the display unit 152. Additionally, the electronic device may display an application name 607 and an application icon 609. The electronic device may execute a message application to display a dialog window on the display unit 152. The electronic device may obtain display data from the message application to display message content of a dialog window via the integrated message program.

After displaying a first dialog window, when a second dialog window display event occurs, the electronic device reduces and displays the first dialog window in step 303. For example, when detecting reception of a message from "assistant manager PARK" via the communication unit 170, the electronic device reduces and displays the dialog window 505 of "assistant manager KIM" 501 illustrated in FIG. 5A in order to display a reduced first dialog window 507 along with a second dialog window as illustrated in FIG. 5B. When executing the dialog window of "assistant manager PARK" 509 according to a user's voice instruction, the electronic device reduces and displays the dialog window 505 of "assistant manager KIM" 501 illustrated in FIG. 5A in order to display the reduced first dialog window 507 along with the second dialog window as illustrated in FIG. 5B.

Figure 6B:
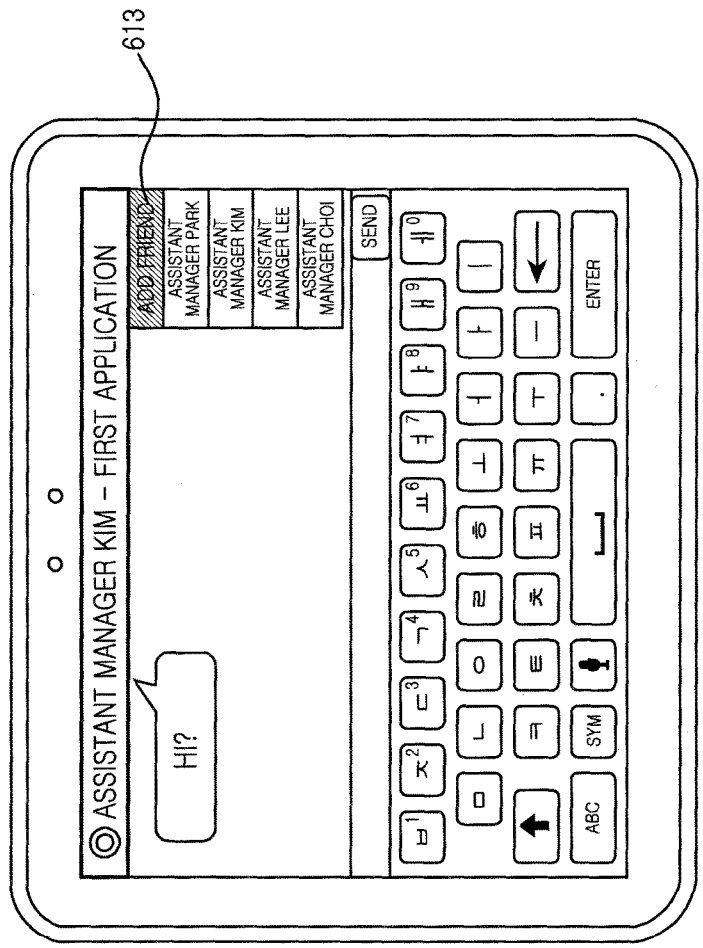
Figure 6C:
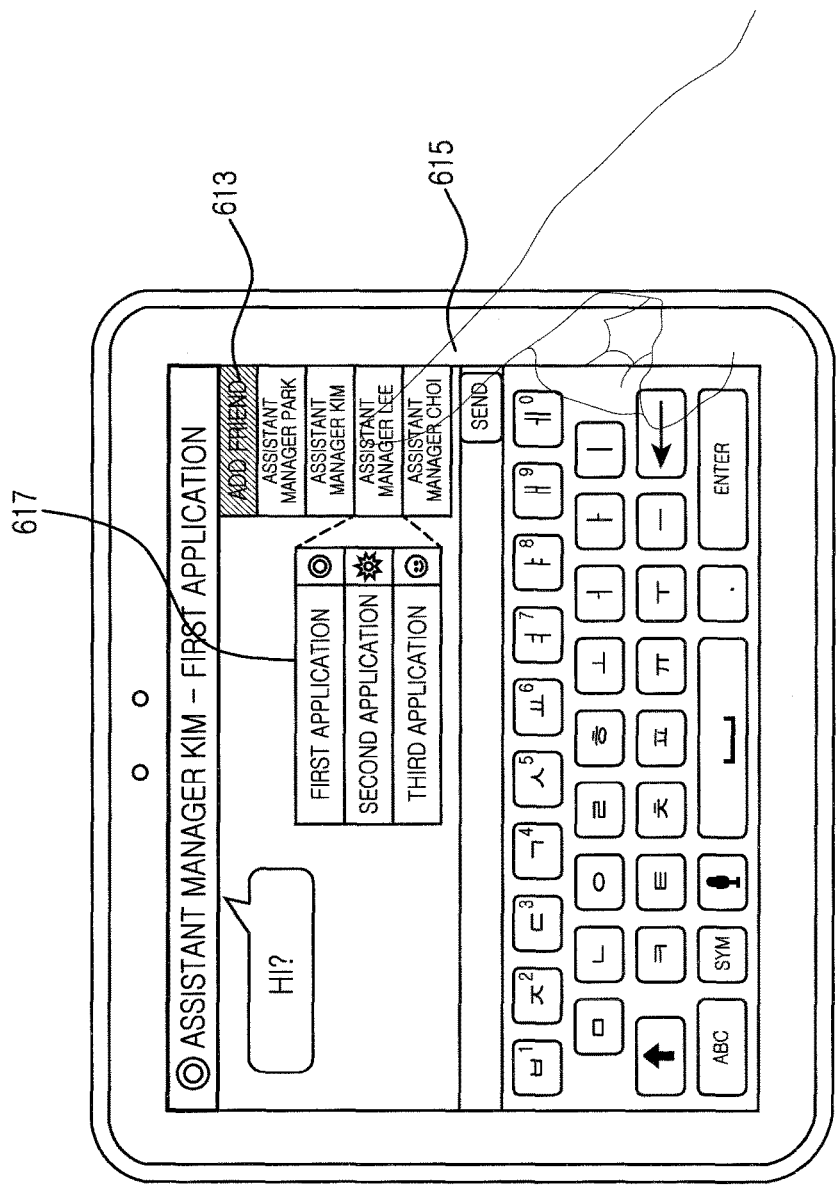
Figure 6D:
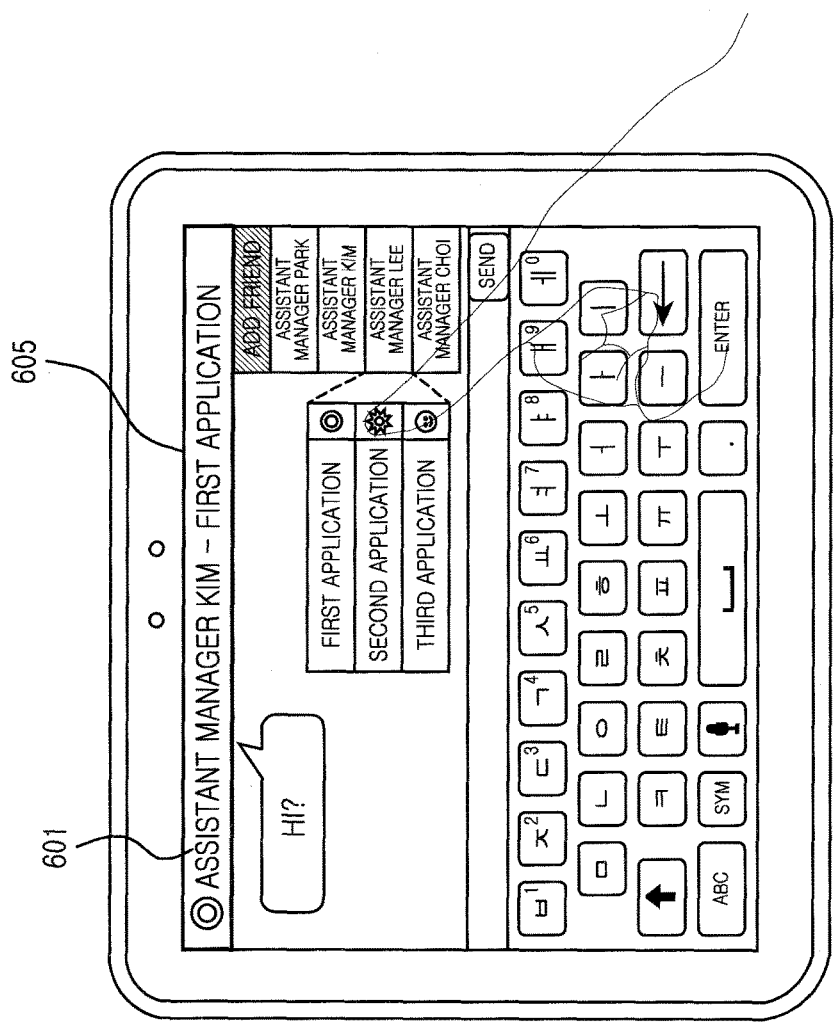
Figure 6E:
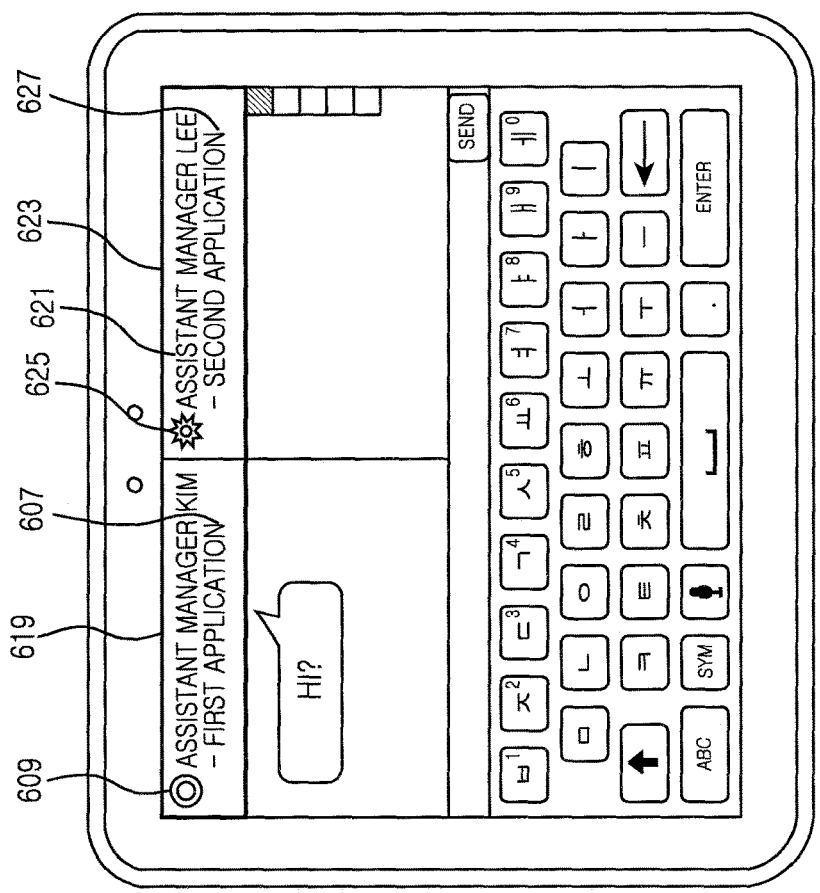

When a menu 611 for adding a second dialog counterpart is selected from the dialog window 605 for "assistant manager KIM" 601 as illustrated in FIG. 6A, the electronic device determines a dialog counterpart selected among assistant manager PARK, assistant manager KIM, assistant manager LEE, and assistant manager CHOI that can be added as the second dialog counterpart as illustrated in FIG. 6B. When "assistant manager LEE" 615 is selected from a friend add list 613 as illustrated in FIG. 6C, the electronic device determines at least one application selected from the application list 617 including a first application program, a second application program, and a third application program that can transmit a message to "assistant manager LEE" 615. When there is an application that can transmit a message to "assistant manager LEE" 615, the electronic device may not display the application list. When an application is selected, the electronic device reduces and displays the dialog window 605 for "assistant manager KIM" 601 illustrated in FIG. 6A as a reduced dialog window as illustrated in FIG. 6E.

After reducing and displaying the first dialog window, the electronic device displays the first dialog window and the second dialog window on the display unit 152 in step 305. For example, the electronic device displays the dialog window 507 of "assistant manager KIM" 501 and the dialog window 511 of "assistant manager PARK" 509 on the display unit 152 as illustrated in FIG. 5B. Additionally, the electronic device may display a name 517 and an icon 519 of an application that has received a message from "assistant manager PARK" 509. As illustrated in FIG. 6E, the electronic device may display a dialog window 619 of "assistant manager KIM" 601 and a dialog window 623 of "assistant manager LEE" 621 on the display unit 152. Additionally, the electronic device may display an application name 627 and an application icon 625. The electronic device may execute a message application to display a dialog window on the display unit 152. The electronic device may obtain display data from the message application to display message content of the dialog window via the integrated message program.

After that, the electronic device ends the present algorithm.

Figure 3B:
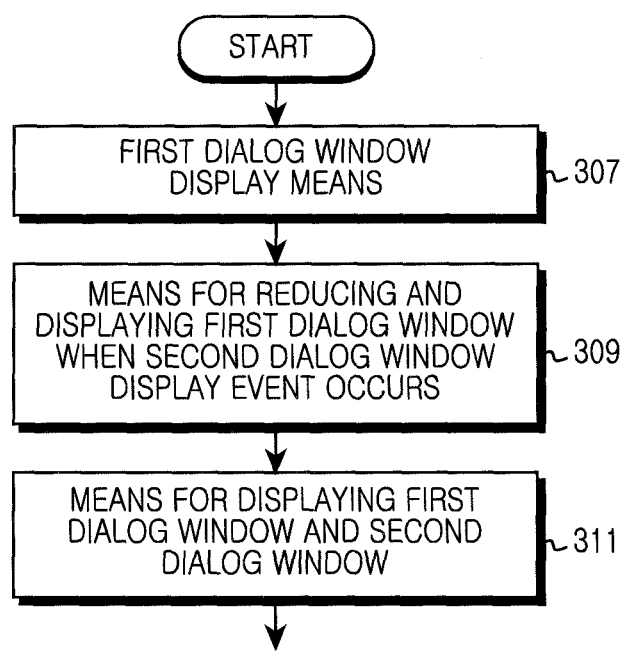
FIG. 3B is a view illustrating an electronic device for displaying a plurality of dialog windows in the electronic device according to an exemplary embodiment of the present invention.

As described above, each procedure for displaying a plurality of dialog windows in an electronic device may include means for displaying a plurality of dialog windows in the electronic device as illustrated in FIG. 3B.

FIG. 3B is a view illustrating an electronic device for displaying a plurality of dialog windows in the electronic device according to an exemplary embodiment of the present invention.

Referring to FIG. 3B, the electronic device includes first means 307 for displaying a first dialog window, second means 309 for reducing and displaying the first dialog window, and third means 311 for displaying the first dialog window and a second dialog window.

The first means 307 displays the first dialog window. For example, when detecting reception of a message from "assistant manager KIM" via the communication unit 170, the electronic device displays the dialog window 505 of "assistant manager KIM" 501 on the display unit 152 as illustrated in FIG. 5A. The electronic device displays a message 503 received from "assistant manager KIM" 501 on the display unit 152. Additionally, the electronic device may display a name 513 and an icon 515 of an application that has received the message 503 from "assistant manager KIM" 501. When executing the dialog window of "assistant manager KIM" according to a user's voice instruction, the electronic device may display the dialog window 505 of "assistant manager KIM" 501 on the display unit 512 as illustrated in FIG. 5A. When a menu for executing the dialog window of "assistant manager KIM" is selected by the user's manipulation, the electronic device may display the dialog window 605 of "assistant manager KIM" 601 on the display unit 152 as illustrated in FIG. 6A. The electronic device may display a message 603 transmitted/received to/from "assistant manager KIM" 601 last on the display unit 152. Additionally, the electronic device may display the application name 607 and the application icon 609. The electronic device may execute a message application to display a dialog window on the display unit 152. Also, the electronic device may obtain display data from the message application to display message content of the dialog window via the integrated message program.

When a second dialog window display event occurs after displaying the first dialog window, the second means 309 reduces and displays the first dialog window. For example, when detecting reception of a message from "assistant manager PARK" via the communication unit 170, the electronic device reduces and displays the dialog window 505 of "assistant manager KIM" 501 as illustrated in FIG. 5B in order to display a reduced first dialog window 507 along with the second dialog window. When executing a dialog window of "assistant manager PARK" according to the user's voice instruction, the electronic device reduces and displays the dialog window 505 of "assistant manager KIM" 501 illustrated in FIG. 5A in order to display the reduced first dialog window 507 along with the second dialog window as illustrated in FIG. 5B. When a menu 611 for adding a second counterpart is selected in the dialog window 605 of "assistant manager KIM" 601 as illustrated in FIG. 6A, the electronic device determines a dialog counterpart selected among "assistant manager PARK", "assistant manager KIM", "assistant manager LEE", and "assistant manager CHOI" addable as a second dialog counterpart as illustrated in FIG. 6B. When "assistant manager LEE" 615 is selected from the friend add list 613 as illustrated in FIG. 6C, the electronic device determines at least one application selected from the application list 617 including a first application, a second application, and a third application. When there is an application that can transmit a message to "assistant manager LEE" 615, the electronic device may not display the application list. When an application is selected, the electronic device reduces and displays the dialog window 605 of "assistant manager KIM" 601 illustrated in FIG. 6A in order to display a reduced first dialog window 619 along with a second dialog window as illustrated in FIG. 6E.

The third means 311 reduces and displays the first dialog window and then displays the first dialog window and the second dialog window on the display unit 152. For example, the electronic device displays the dialog window 507 of "assistant manager KIM" 501 and the dialog window 511 of "assistant manager PARK" 509 on the display unit 152 as illustrated in FIG. 5B. Additionally, the electronic device may display a name 517 and an icon 519 of an application that has received a message from "assistant manager PARK" 509. The electronic device may display a dialog window 619 of "assistant manager KIM" 601 and a dialog window 623 of "assistant manager LEE" 621 on the display unit 152 as illustrated in FIG. 6E. Additionally, the electronic device may display a name 627 and an icon 625 of an application. The electronic device may execute a message application to display a dialog window on the display unit 152. Also, the electronic device may obtain display data from the message application to display message content of the dialog window via the integrated message program.

As described above, the electronic device includes respective means for displaying a plurality of dialog windows. According to an exemplary embodiment of the present invention, the respective means for displaying the plurality of dialog windows may be configured in one means.

Figure 4:
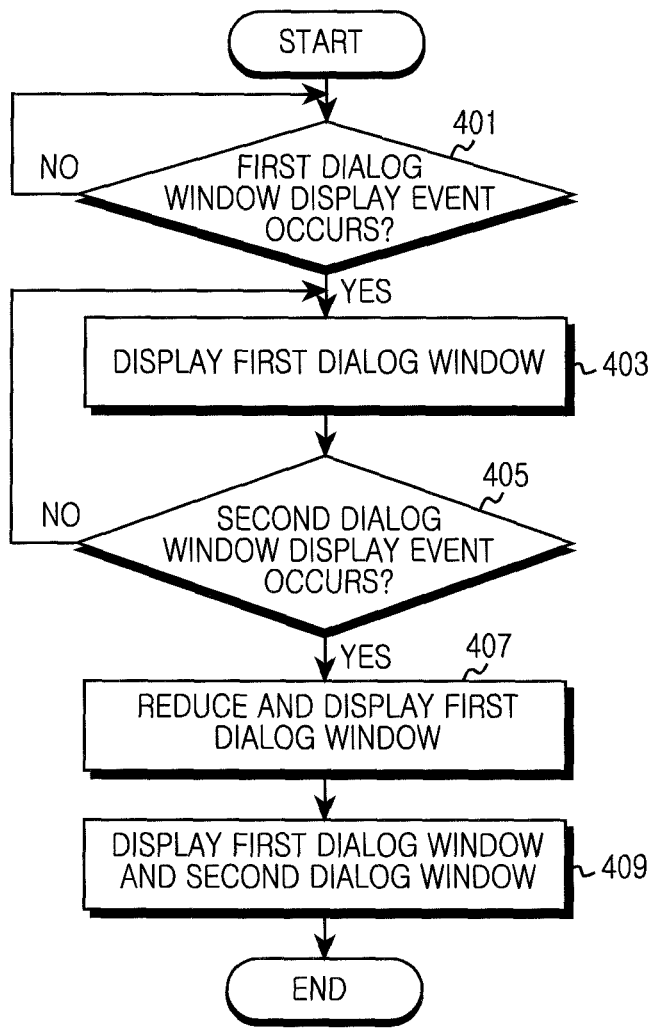
FIG. 4 is a flowchart illustrating a procedure for displaying a plurality of dialog windows in an electronic device according to an exemplary embodiment of the present invention.

FIG. 4 illustrates a procedure for displaying a plurality of dialog windows in an electronic device according to an exemplary embodiment of the present invention.

Referring to FIG. 4, the electronic device determines whether a first dialog window display event occurs in step 401. For example, the electronic device determines whether reception of a message from a first dialog counterpart is detected via the communication unit 170. When a message transmission program is executed, the electronic device may determine whether a menu for executing a dialog window of the first dialog counterpart is selected by a user's manipulation. When the message transmission program is executed, the electronic device may execute the dialog window of the first dialog counterpart according to the user's voice instruction.

When the first dialog window display event occurs, the electronic device displays the first dialog window on the display unit 152 in step 403. For example, when detecting reception of a message from "assistant manager KIM" via the communication unit 170, the electronic device displays the dialog window 505 of "assistant manager KIM" 501 on the display unit 152 as illustrated in FIG. 5A. The electronic device displays a message 503 received from "assistant manager KIM" 501 on the display unit 152. Additionally, the electronic device may display a name 513 and an icon 515 of an application that has received the message 503 from "assistant manager KIM" 501. When executing the dialog window of "assistant manager KIM" according to a user's voice instruction, the electronic device may display the dialog window 505 of "assistant manager KIM" 501 on the display unit 152 as illustrated in FIG. 5A. When a menu for executing the dialog window of "assistant manager KIM" is selected by the user's manipulation, the electronic device may display the dialog window 605 of "assistant manager KIM" 601 on the display unit 152 as illustrated in FIG. 6A. The electronic device may display a message transmitted/received to/from "assistant manager KIM" 601 last on the display unit 152. Additionally, the electronic device may display a name 607 and an icon 609 of an application. The electronic device may execute a message application to display a dialog window on the display unit 152. Also, the electronic device may obtain display data from a message application to display message content of the dialog window via the integrated message program.

After displaying a first dialog window, the electronic device determines whether a second dialog window display event occurs in step 405. For example, the electronic device determines whether reception of a message from a second dialog counterpart is detected via the communication unit 170. The electronic device may execute a dialog window of the second dialog counterpart according to a user's voice instruction. When a menu 611 for adding the second dialog counterpart is selected in the dialog window 605 of "assistant manager KIM" 601 as illustrated in FIG. 6A, the electronic device determines a dialog counterpart selected among "assistant manager PARK", "assistant manager KIM", "assistant manager LEE", and "assistant manager CHOI" addable as the second dialog counterpart as illustrated in FIG. 6B. When "assistant manager LEE" 615 is selected from the friend add list 613 as illustrated in FIG. 6C, the electronic device determines at least one application selected from the application list 617 including a first application program, a second application program, and a third application program that can transmit a message to "assistant manager LEE" 615. When there is an application that can transmit a message to "assistant manager LEE" 615, the electronic device may not display the application list.

When the second dialog window display event occurs, the electronic device reduces and displays the first dialog window in step 407. For example, when detecting reception of a message from "assistant manager PARK" via the communication unit 170, the electronic device reduces and displays the dialog window 505 of "assistant manager KIM" 501 illustrated in FIG. 5A in order to display a reduced first dialog window 507 along with the second dialog window as illustrated in FIG. 5B. When executing a dialog window of "assistant manager PARK" according to the user's voice instruction, the electronic device reduces and displays the dialog window 505 of "assistant manager KIM" 501 illustrated in FIG. 5A in order to display the reduced first dialog window 507 along with the second dialog window as illustrated in FIG. 5B. When executing a dialog window of "assistant manager LEE" according to the user's manipulation, the electronic device reduces and displays the dialog window 605 of "assistant manager KIM" 601 illustrated in FIG. 6A in order to display a reduced first dialog window 619 along with the second dialog window as illustrated in FIG. 6E.

The electronic device displays the first dialog window and the second dialog window on the display unit 152 in step 409. For example, the electronic device may display the dialog window 507 of "assistant manager KIM" 501 and the dialog window 511 of "assistant manager PARK" 509 on the display unit 512 as illustrated in FIG. 5B. Additionally, the electronic device may display a name 517 and an icon 519 of an application that has received a message from "assistant manager PARK" 509. The electronic device may display the dialog window 619 of "assistant manager KIM" 601 and the dialog window 623 of "assistant manager LEE" 621 on the display unit 152 as illustrated in FIG. 6E. Additionally, the electronic device may display a name 627 and an icon 625 of an application. The electronic device may execute a message application to display the dialog window on the display unit 152. Also, the electronic device may obtain display data from the message application to display message content of the dialog window via the integrated message program.

After that, the electronic device ends the present algorithm.

Figure 7:
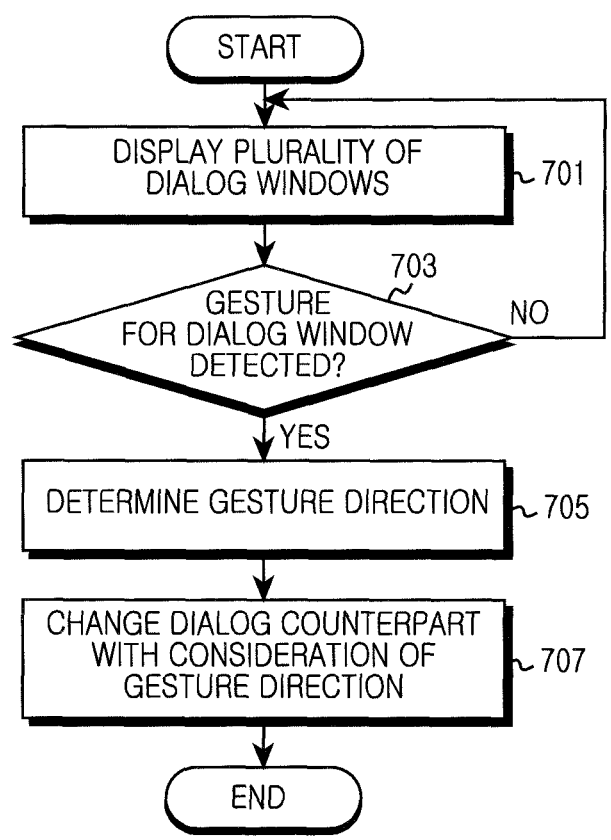
FIG. 7 is a flowchart illustrating a procedure for changing a dialog window with consideration of a direction of a gesture in an electronic device displaying a plurality of dialog windows according to an exemplary embodiment of the present invention.

FIG. 7 illustrates a procedure for changing a dialog window with consideration of a direction of a gesture in an electronic device displaying a plurality of dialog windows according to an exemplary embodiment of the present invention. FIGS. 8A to 8D are views illustrating a screen configuration for changing a dialog window with consideration of a direction of a gesture in an electronic device displaying a plurality of dialog windows according to an exemplary embodiment of the present invention.

Figure 8A:
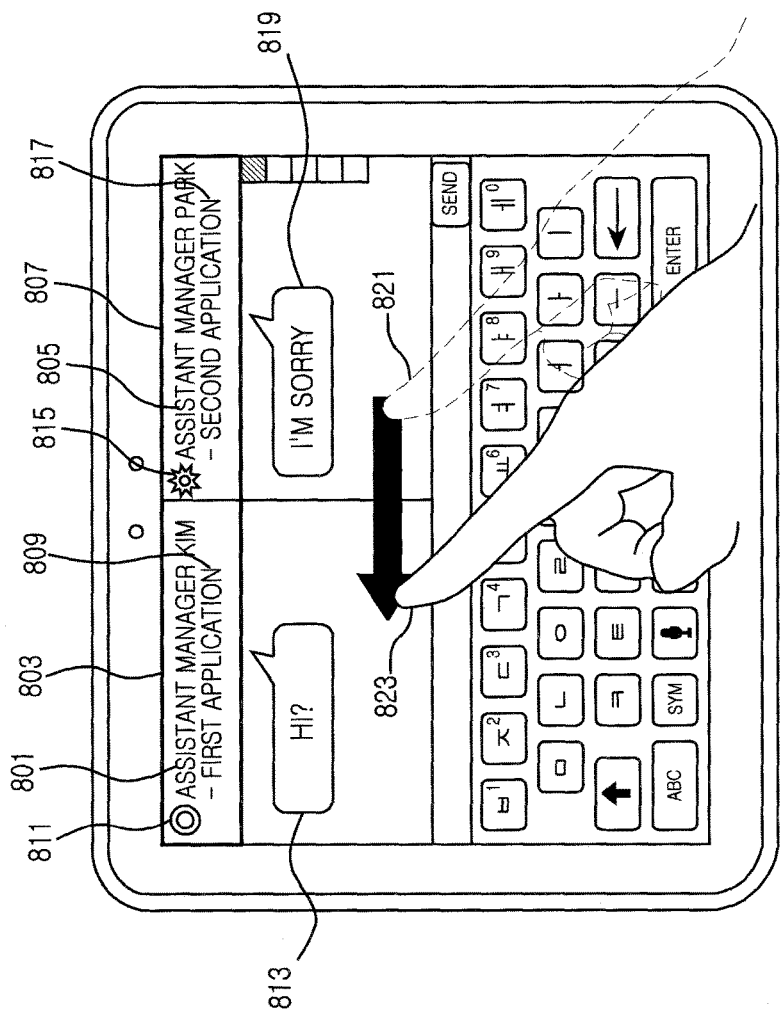
FIGS. 8A to 8D are views illustrating a screen configuration for changing a dialog window with consideration of a direction of a gesture in an electronic device displaying a plurality of dialog windows according to an exemplary embodiment of the present invention.
Figure 8B:
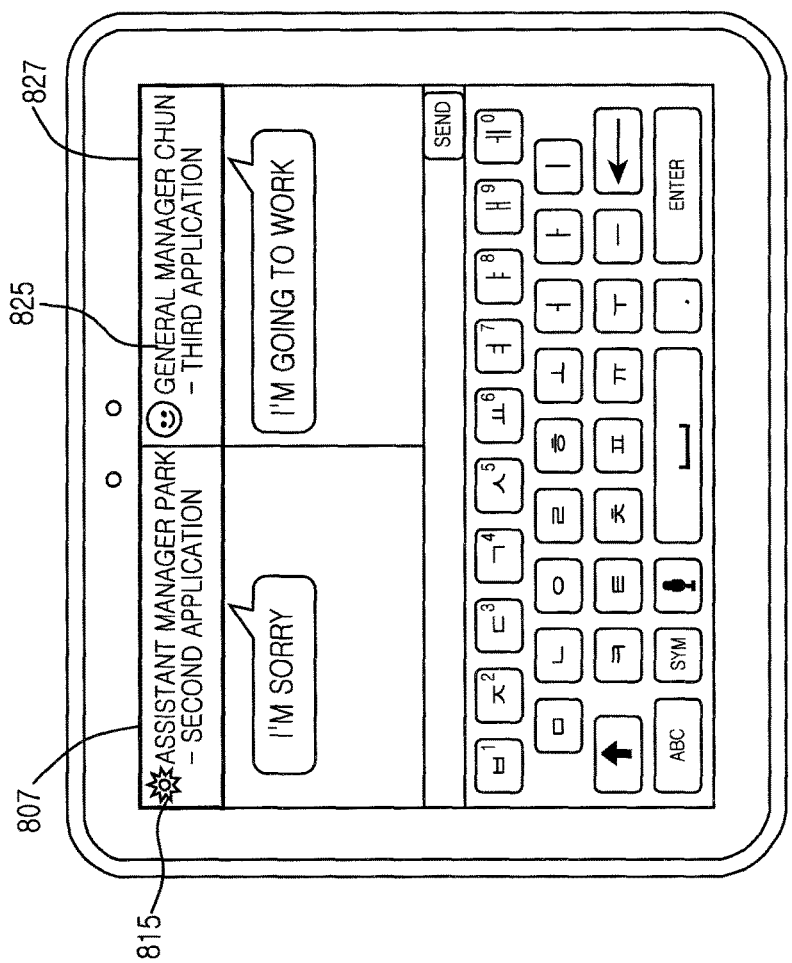
Figure 8C:
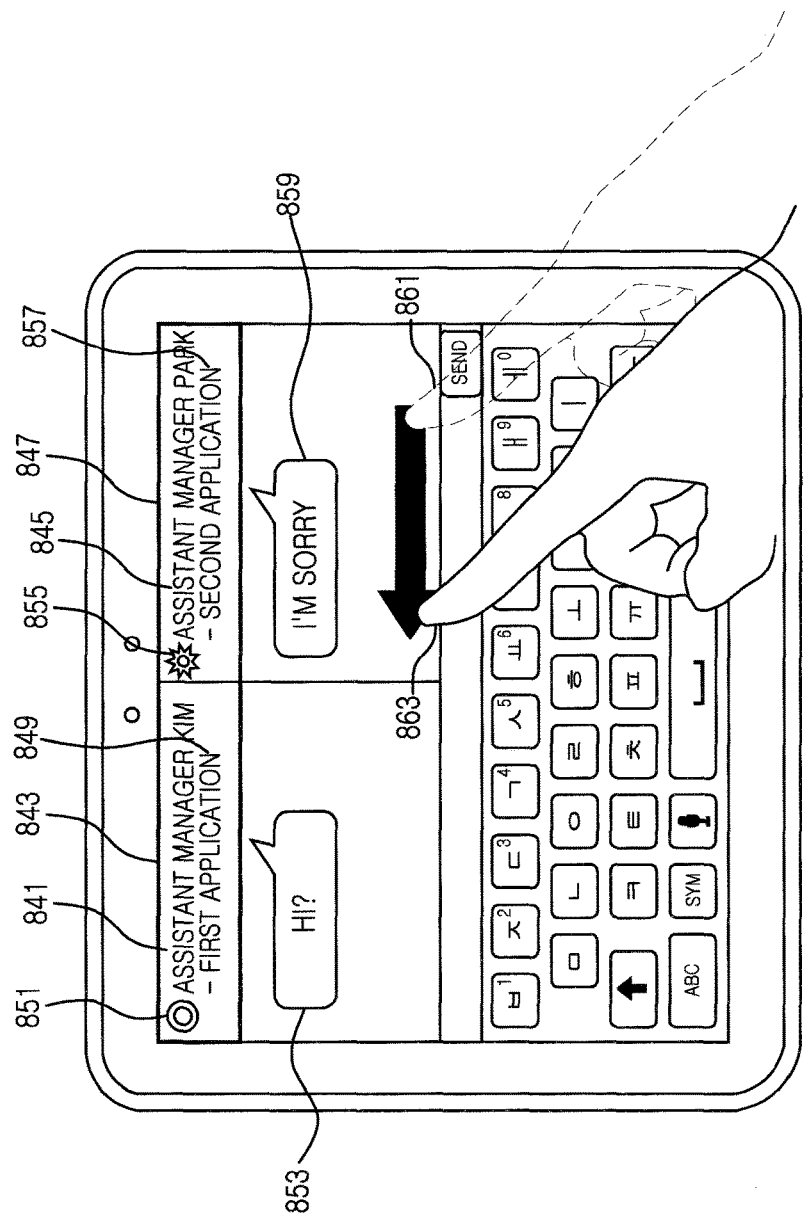

Referring to FIG. 7 and FIGS. 8A-8D, the electronic device displays a plurality of dialog windows in step 701. For example, the electronic device displays a first dialog window 803 of "assistant manager KIM" 801, and a second dialog window 807 of "assistant manager PARK" 805 as illustrated in FIG. 8A. Additionally, the electronic device may display application names 809 and 817, application icons 811 and 815, and messages 813 and 819. The electronic device may display a third dialog window 843 of "assistant manager KIM" 841 and a fourth dialog window 847 of "assistant manager PARK" 845 as illustrated in FIG. 8C. Additionally, the electronic device may display application names 849 and 857, application icons 851 and 855, and messages 853 and 859. The electronic device may execute a message application to display a dialog window on the display unit 152. The electronic device may obtain display data from a message application to display message content of the dialog window via the integrated message program.

After displaying a plurality of dialog windows, the electronic device determines whether a gesture for a dialog window is detected in step 703. When detecting the gesture for the dialog window, the electronic device determines the direction of the gesture in step 705. For example, the electronic device determines whether a drag progressing from a first point 821 to a second point 823 is detected as illustrated in FIG. 8A. The electronic device may determine whether a drag progressing from a third point 861 to a fourth point 863 is detected as illustrated in FIG. 8C.

Figure 8D:
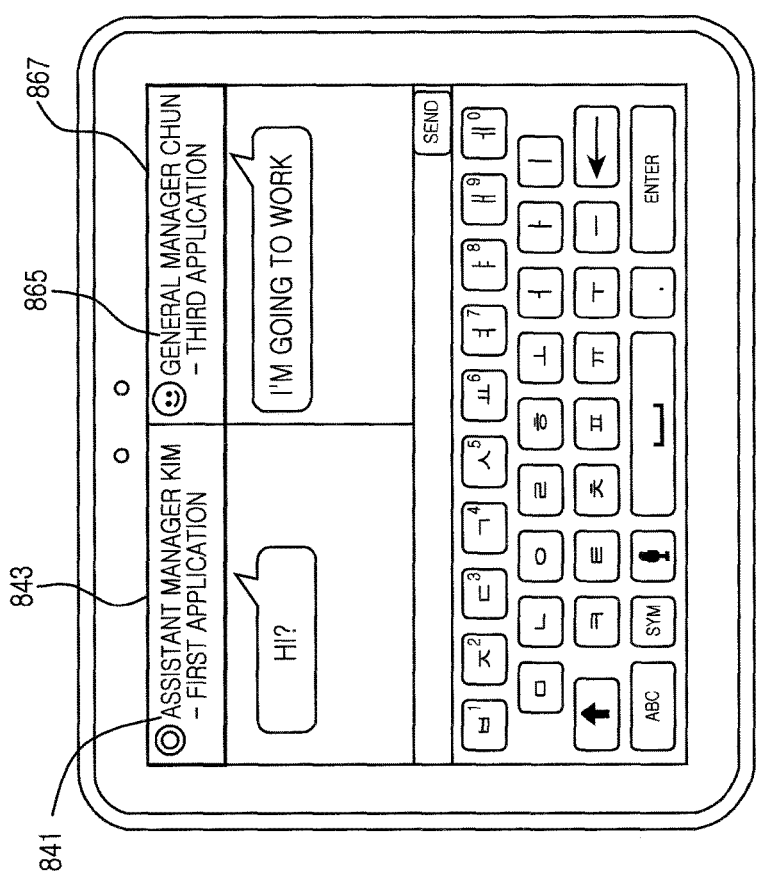

The electronic device changes a dialog window with consideration of the direction of a gesture in step 707. For example, when detecting a drag progressing from the first point 821 to the second point 823 as illustrated in FIG. 8A, the electronic device displays a second dialog window 807 of "assistant manager PARK" 815 and a fifth dialog window 827 of "general manager CHUN" 825 as illustrated in FIG. 8B. The fifth dialog window 827 of "general manager CHUN" 825 may be a dialog window where a message transmission/reception record exists recently next to the first dialog window 803 of "assistant manager KIM" 801 and the second dialog window 807 of "assistant manager PARK" 805 illustrated in FIG. 8A. When detecting a drag progressing from the third point 861 to the fourth point 863 as illustrated in FIG. 8C, the electronic device displays a third dialog window 843 of "assistant manager KIM" 841 and a sixth dialog window 867 of "general manager CHUN" 865 as illustrated in FIG. 8D. The sixth dialog window 867 of "general manager CHUN" 865 may be a dialog window where a message transmission/reception record exists recently next to the third dialog window 843 of "assistant manager KIM" 841 and the fourth dialog window 847 of "assistant manager PARK" 845 illustrated in FIG. 8C. The electronic device may execute a message application to display a dialog window on the display unit 152. The electronic device may also obtain display data from a message application to display message content of the dialog window via the integrated message program.

After that, the electronic device ends the present algorithm.

In the above exemplary embodiment of the present invention, the electronic device changes a dialog window with consideration of the direction of a gesture. According to another exemplary embodiment of the present invention, the electronic device may change the dialog window according to a user's voice instruction.

Figure 9:
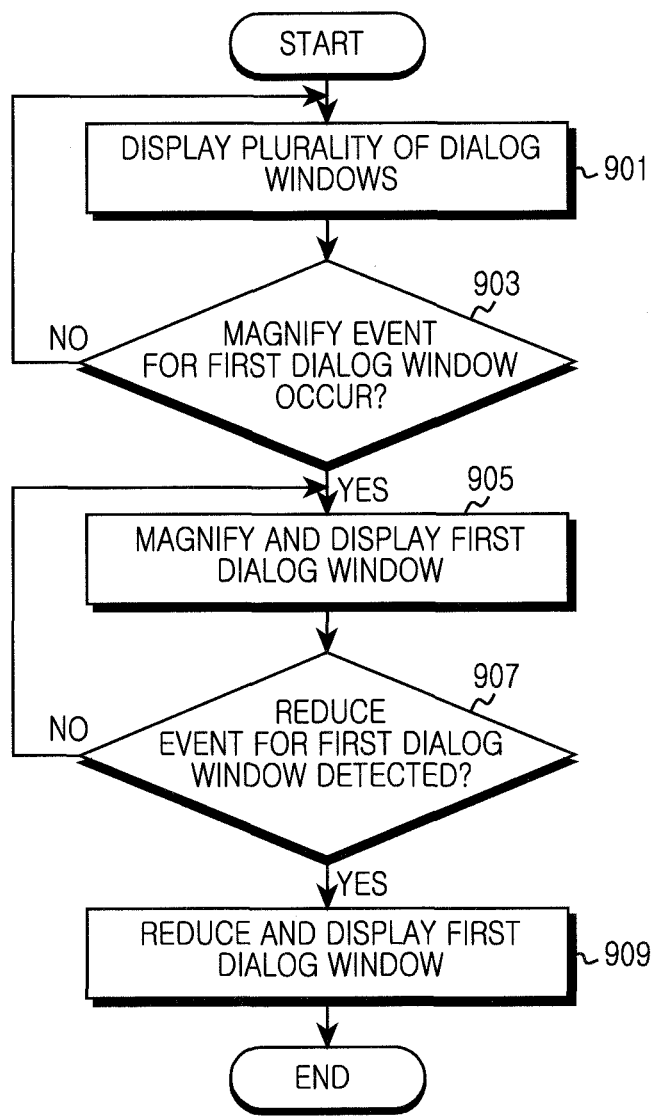
FIG. 9 is a flowchart illustrating a procedure for changing a size of at least one dialog window in an electronic device displaying a plurality of dialog windows according to an exemplary embodiment of the present invention.
Figure 10A:
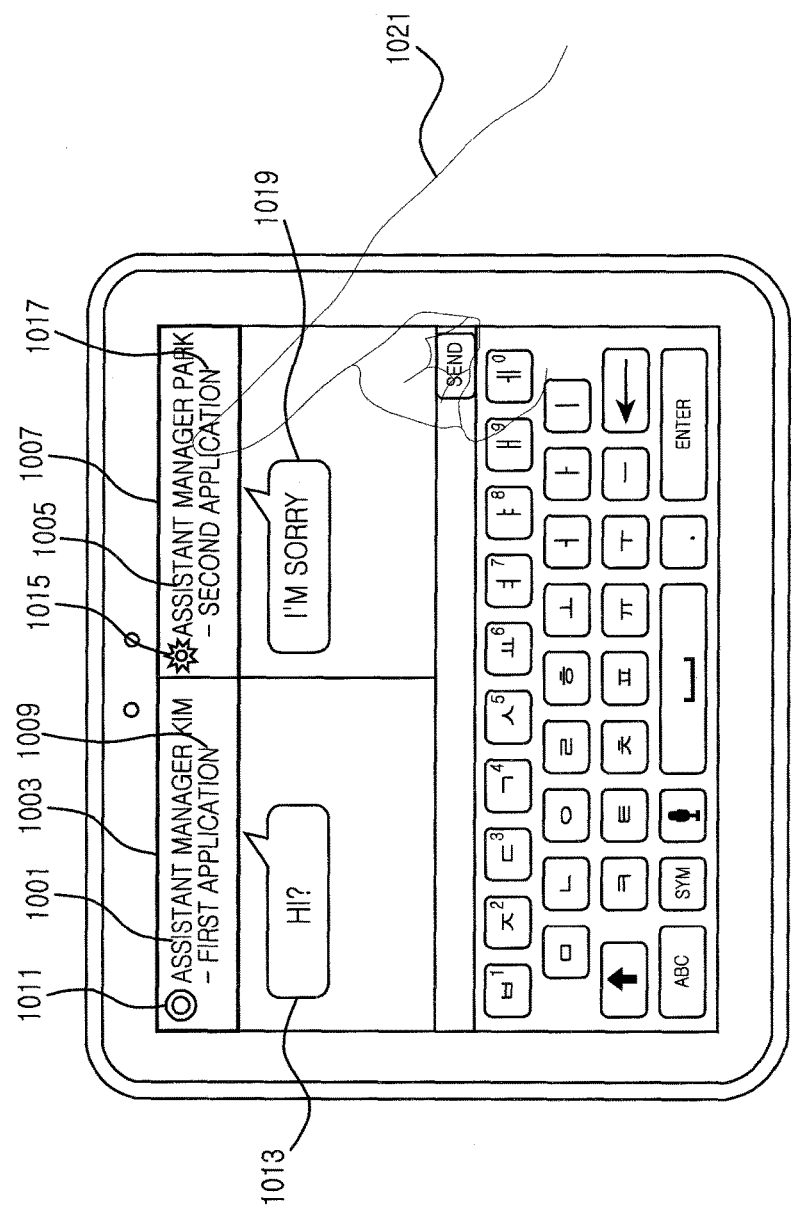
FIGS. 10A and 10B are views illustrating a screen configuration for changing a size of at least one dialog window in an electronic device displaying a plurality of dialog windows according to an exemplary embodiment of the present invention.
Figure 10B:
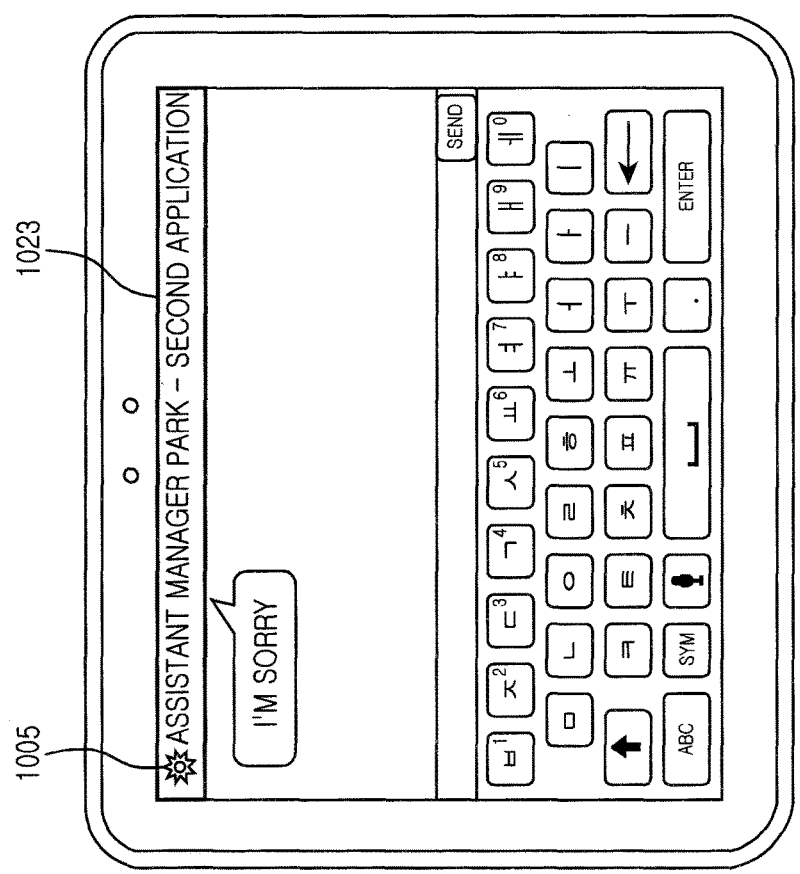

FIG. 9 illustrates a procedure for changing a size of at least one dialog window in an electronic device displaying a plurality of dialog windows according to an exemplary embodiment of the present invention. FIGS. 10A and 10B are views illustrating a screen configuration for changing a size of at least one dialog window in an electronic device displaying a plurality of dialog windows according to an exemplary embodiment of the present invention.

Referring to FIG. 9, the electronic device displays a plurality of dialog windows in step 901. For example, the electronic device displays a second dialog window 1003 of "assistant manager KIM" 1001 and a first dialog window 1007 of "assistant manager PARK" 1005 as illustrated in FIG. 10A. Additionally, the electronic device may display application names 1009 and 1017, application icons 1011 and 1015, and messages 1013 and 1019. The electronic device may execute a message application to display a dialog window on the display unit 152. The electronic device may also obtain display data from a message application to display message content of the dialog window via the integrated message program.

After displaying a plurality of dialog windows, the electronic device determines whether a magnify event for a first dialog window occurs. For example, the electronic device determines whether a dialog window magnify icon is selected. The electronic device may determine whether the dialog window magnify event occurs with consideration of input information of a hardware button. The electronic device may determine whether the dialog window magnify event occurs with consideration of input information of a hardware button and movement information of the electronic device. The electronic device may determine whether the dialog window magnify event occurs with consideration of touch information for the touchscreen. The electronic device may determine whether the dialog window magnify event occurs with consideration of touch information for the touchscreen and movement information of the electronic device. The electronic device may determine whether the dialog window magnify event occurs depending on a user's voice instruction.

When a magnify event for the first dialog window is detected, the electronic device magnifies and displays the first dialog window in step 905. For example, when a touch for an information display region 1021 is maintained for a reference time or more in the first dialog window 1007 of "assistant manager PARK" 1005 as illustrated in FIG. 10A, the electronic device recognizes a request to magnify and display the first dialog window 1007 of "assistant manager PARK" 1005. Accordingly, the electronic device magnifies and displays the first dialog window 1007 of "assistant manager PARK" 1005 as an enlarged first dialog window 1023 as illustrated in FIG. 10B.

After magnifying and displaying the first dialog window, the electronic device determines whether a reduce event for the first dialog window occurs in step 907. For example, the electronic device determines whether a dialog window reduce icon is selected. The electronic device may determine whether a dialog window reduce event occurs with consideration of input information of a hardware button. The electronic device may determine whether a dialog window reduce event occurs with consideration of input information of a hardware button and movement information of the electronic device. The electronic device may determine whether a dialog window reduce event occurs with consideration of touch information for the touchscreen. The electronic device may determine whether a dialog window reduce event occurs with consideration of touch information for the touchscreen and movement information of the electronic device. The electronic device may determine whether a dialog window reduce event occurs depending on a user's voice instruction.

When the reduce event for the first dialog window is detected, the electronic device reduces and displays the first dialog window in step 905. For example, when detecting a double tap in a first dialog window 1023 of "assistant manager PARK" 1005 as illustrated in FIG. 10B, the electronic device recognizes a request to restore the first dialog window 1023 of "assistant manager PARK" 1005 being magnified to the previous state. Accordingly, the electronic device reduces and displays in step 1007 the first dialog window 1023 of "assistant manager PARK" 1005 as illustrated in FIG. 10A.

After that, the electronic device ends the present algorithm.

Figure 11A:
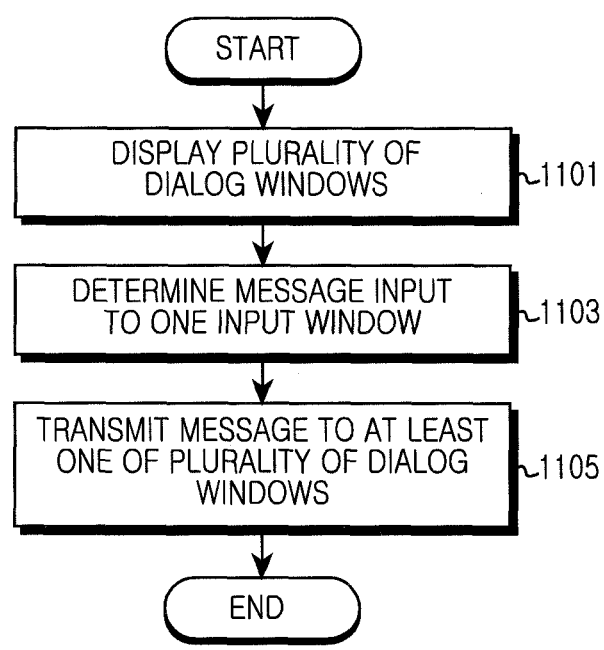
FIG. 11A is a flowchart illustrating a procedure for transmitting a message input to a dialog window to at least one dialog window in an electronic device displaying a plurality of dialog windows according to an exemplary embodiment of the present invention.

FIG. 11A illustrates a procedure for transmitting a message input to a dialog window to at least one dialog window after an electronic device displays a plurality of dialog windows according to an exemplary embodiment of the present invention. FIGS. 13A to 13E are views illustrating a screen configuration for transmitting a message input to a dialog window to at least one dialog window in an electronic device displaying a plurality of dialog windows according to an embodiment of the present invention.

Figure 13A:
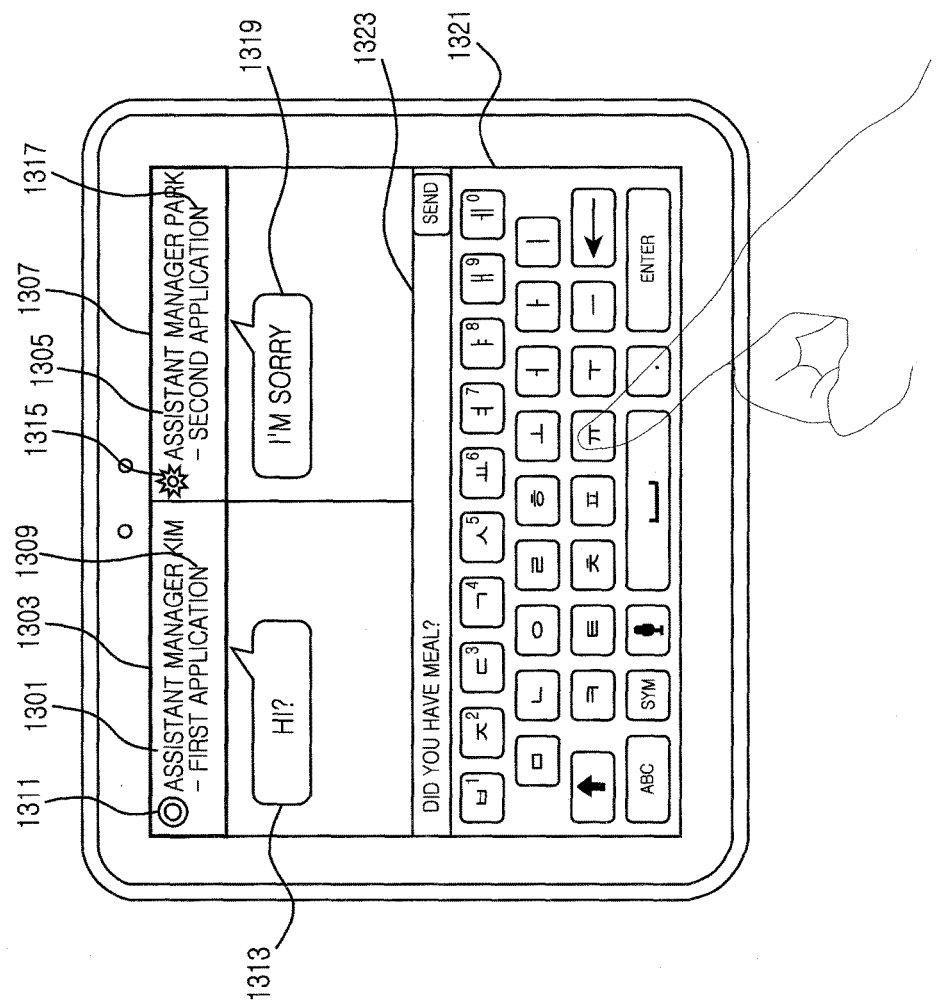
FIGS. 13A to 13E are views illustrating a screen configuration for transmitting a message input to a dialog window to at least one dialog window in an electronic device displaying a plurality of dialog windows according to an embodiment of the present invention.

Referring to FIG. 11A and FIGS. 13A to 13E, the electronic device displays a plurality of dialog windows in step 1101. For example, the electronic device displays a first dialog window 1303 of "assistant manager KIM" 1301 and a second dialog window 1307 of "assistant manager PARK" 1305 as illustrated in FIG. 13A. Additionally, the electronic device may display application names 1309 and 1317, application icons 1311 and 1315, and messages 1313 and 1319. The electronic device may execute a message application to display a dialog window on the display unit 152. The electronic device may also obtain display data from a message application to display message content of the dialog window via the integrated message program.

After displaying a plurality of dialog windows, the electronic device determines a message input to an input window in step 1103. For example, when detecting a message input via a keypad 1321 displayed on the display unit 152 as illustrated in FIG. 13A, the electronic device displays a message on the input window 1323. When detecting a user's voice input via the microphone 132, the electronic device may display a message on the input window 1323.

Figure 13B:
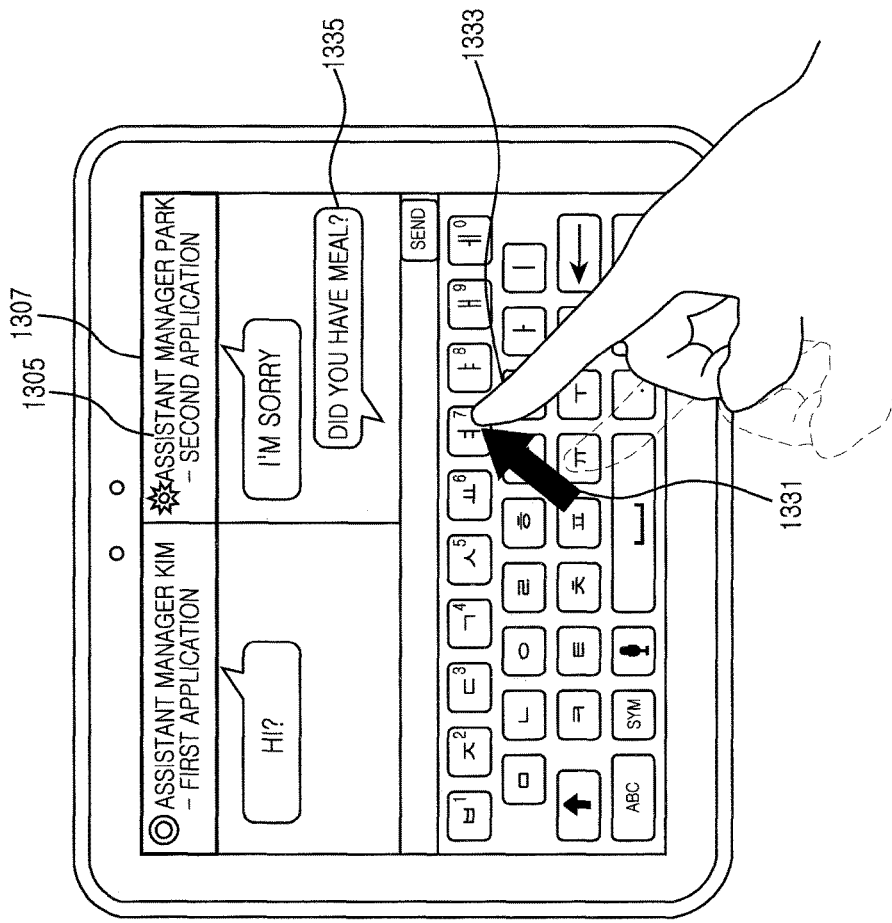

After determining the message input to the input window, the electronic device transmits the message to at least one of a plurality of dialog windows in step 1105. For example, when detecting a drag moving from a first point 1331 to a second point 1333 as illustrated in FIG. 13B, the electronic device transmits the message of the input window 1323 illustrated in FIG. 13A to the second dialog window 1307 of "assistant manager PARK" 1305. Accordingly, the electronic device displays the transmitted message 1335 on the second dialog window 1307 of "assistant manager PARK" 1305 as illustrated in FIG. 13B.

Figure 13C:
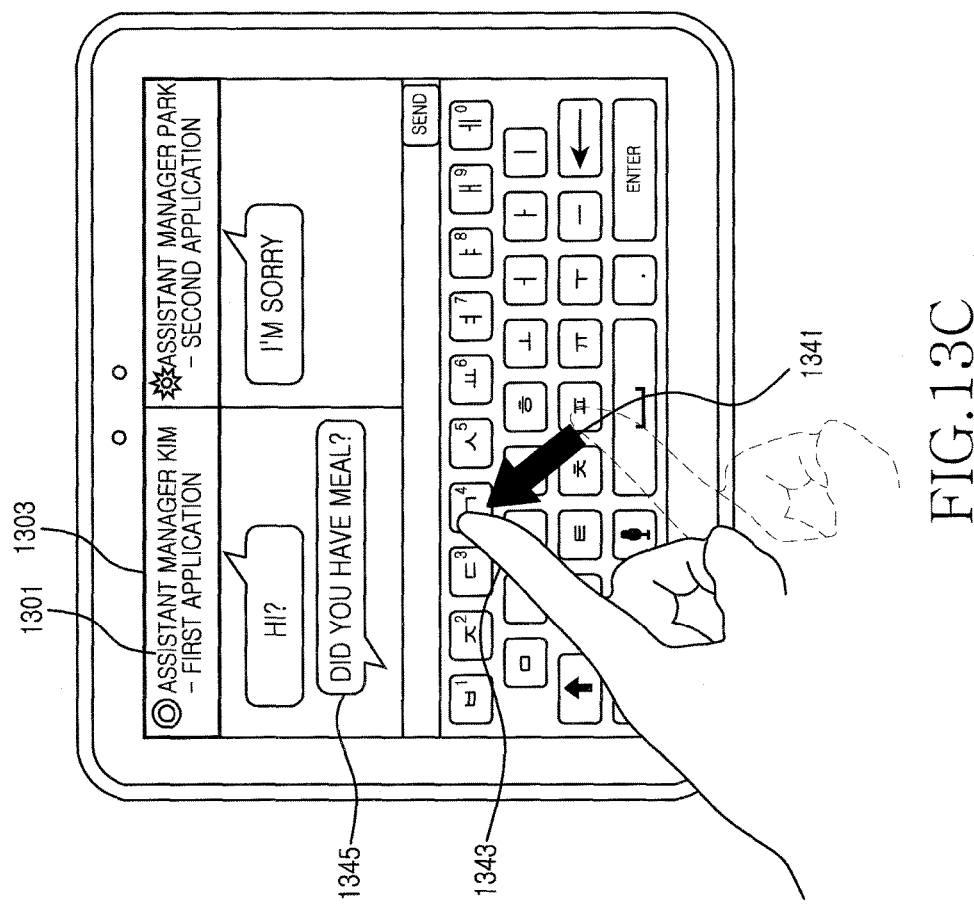

When detecting a drag moving from a third point 1341 to a fourth point 1343 as illustrated in FIG. 13C, the electronic device may transmit the message of the input window 1323 illustrated in FIG. 13A to the first dialog window 1303 of "assistant manager KIM" 1301. Accordingly, the electronic device may display the transmitted message 1345 on the first dialog window 1303 of "assistant manager KIM" 1301 as illustrated in FIG. 13C.

Figure 13D:
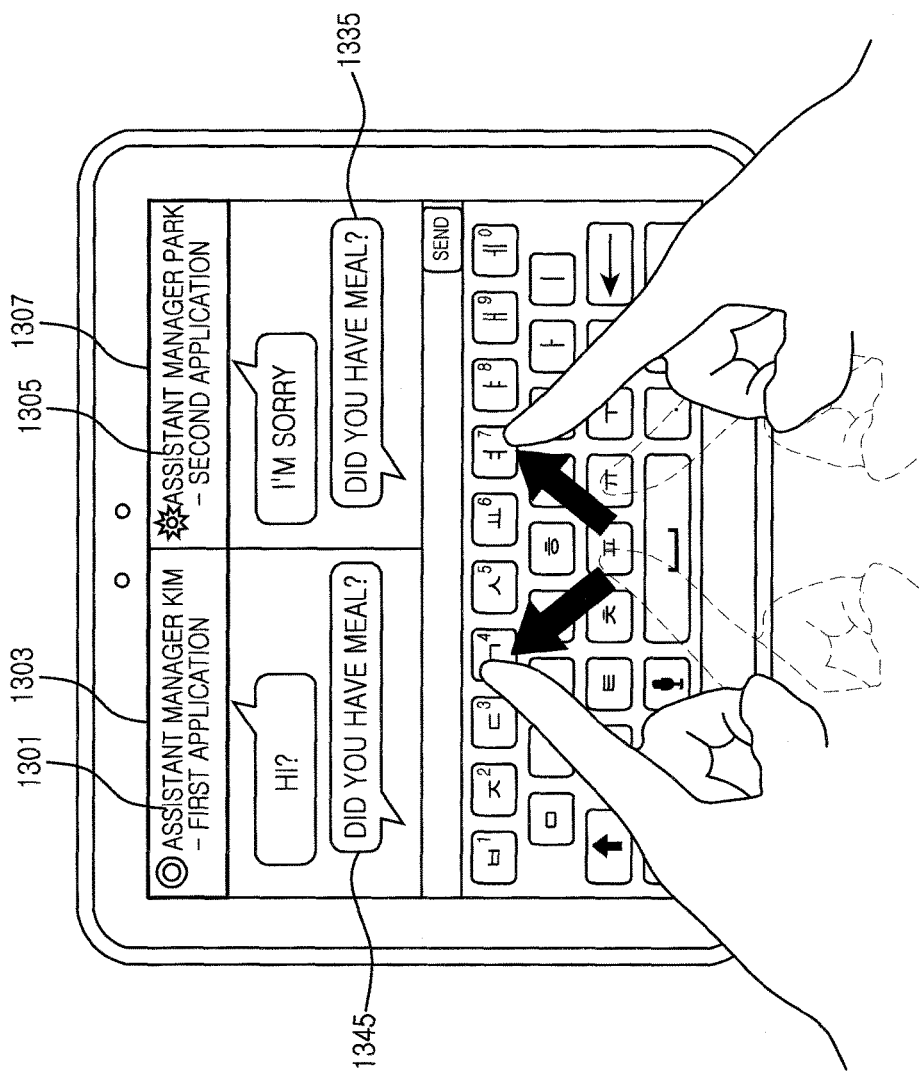

When detecting a touch moving from the first point 1331 and the third point 1341 to the second point 1333 and the fourth point 1343 as illustrated in FIG. 13D, the electronic device may transmit the message of the input window 1323 illustrated in FIG. 13A to the second dialog window 1307 of "assistant manager PARK" 1305 and the first dialog window 1303 of "assistant manager KIM" 1301. Accordingly, the electronic device may display the transmitted messages 1335 and 1345 on the second dialog window 1307 of "assistant manager PARK" 1305 and the first dialog window 1303 of "assistant manager KIM" 1301 as illustrated in FIG. 13D.

Figure 13E:
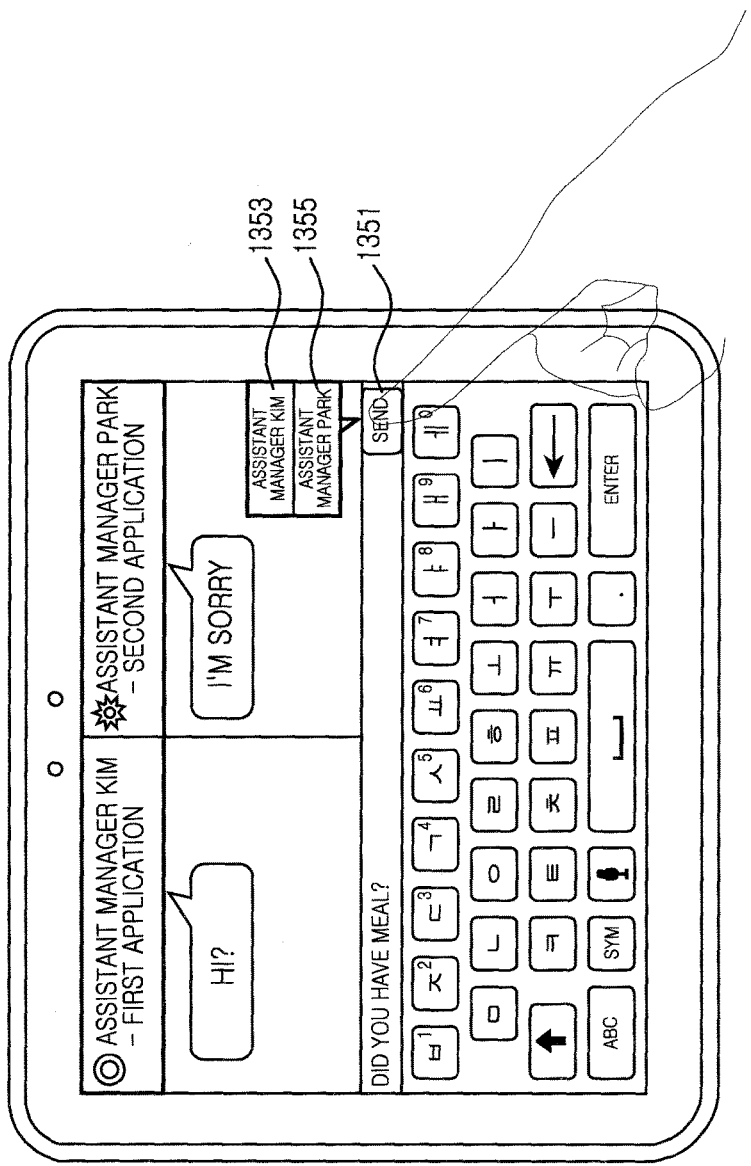

When a "send" icon 1351 is selected as illustrated in FIG. 13E, the electronic device may display "assistant manager KIM" 1353 and "assistant manager PARK" 1355 which can transmit a message on the display unit 152. The electronic device may transmit a message to a dialog window selected among "assistant manager KIM" 1353 and "assistant manager PARK" 1355.

Additionally, the electronic device may determine a dialog window to which the electronic device will transmit a message depending on a user's voice instruction. Moreover, it would be understood that when the electronic device transmits a message to a dialog window, the electronic device may also transmit a message to the contact shown in the dialog window via the communication unit 170.

After that, the electronic device ends the present algorithm.

Figure 11B:
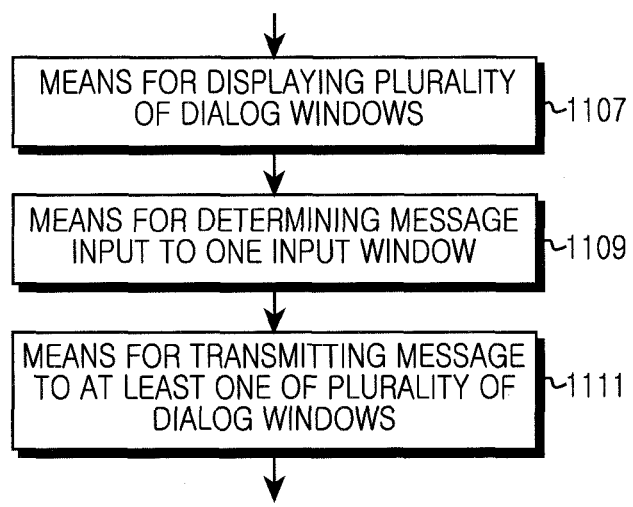
FIG. 11B is a view illustrating an electronic device for transmitting a message input to a dialog window to at least one dialog window in the electronic device displaying a plurality of dialog windows according to an exemplary embodiment of the present invention.

As described above, respective procedures for displaying a plurality of dialog windows, and then transmitting a message input to a dialog window to at least one dialog window may be configured using means for displaying a plurality of dialog windows, and then transmitting a message input to a dialog window to at least one dialog window in an electronic device as illustrated in FIG. 11B.

FIG. 11B is a view illustrating an electronic device for transmitting a message input to a dialog window to at least one dialog window after displaying a plurality of dialog windows according to an exemplary embodiment of the present invention.

Referring to FIG. 11B, the electronic device includes first means 1107 for displaying a plurality of dialog windows, second means 1109 for determining a message input to an input window, and third means 1111 for transmitting a message to one of the plurality of dialog windows.

The first means 1107 displays the plurality of dialog windows. For example, the electronic device displays the first dialog window 1303 of "assistant manager KIM" 1301 and the second dialog window 1307 of "assistant manager PARK" 1305 as illustrated in FIG. 13A. Additionally, the electronic device may display the application names 1309 and 1317, the application icons 1311 and 1315, and the messages 1313 and 1319. The electronic device may execute a message application to display a dialog window on the display unit 152. The electronic device may also obtain display data from a message application to display message content of the dialog window via the integrated message program.

The second means 1109 determines a message input to an input window. For example, when detecting a message input via the keypad 1321 displayed on the display unit 152 as illustrated in FIG. 13A, the electronic device displays the message on the input window 1323. When detecting a user's voice input via the microphone 132, the electronic device may display a message on the input window 1323.

The third means 1111 transmits a message to one of a plurality of dialog windows. When detecting a drag moving from the first point 1331 to the second point 1333 as illustrated in FIG. 13B, the electronic device transmits the message of the input window 1323 illustrated in FIG. 13A to the second dialog window 1307 of "assistant manager PARK" 1305. Accordingly, the electronic device displays the transmitted message 1335 on the second dialog window 1307 of "assistant manager PARK" 1305 as illustrated in FIG. 13B.

When detecting a drag moving from the third point 1341 to the fourth point 1343 as illustrated in FIG. 13C, the electronic device may transmit the message of the input window illustrated in FIG. 13A to the first dialog window 1303 of "assistant manager KIM" 1301. Accordingly, the electronic device may display the transmitted message 1345 on the first dialog window 1303 of "assistant manager KIM" 1301 as illustrated in FIG. 13C.

When detecting a touch moving from the first point 1331 and the third point 1341 to the second point 1333 and the fourth point 1343 as illustrated in FIG. 13D, the electronic device may transmit the message of the input window 1323 illustrated in FIG. 13A to the second dialog window 1307 of "assistant manager PARK" 1305 and the first dialog window 1303 of "assistant manager KIM" 1301. Accordingly, the electronic device may display the transmitted messages 1335 and 1345 on the second dialog window 1307 of "assistant manager PARK" 1305 and the first dialog window 1303 of "assistant manager KIM" 1301 as illustrated in FIG. 13D.

When the "send" icon 1351 is selected as illustrated in FIG. 13E, the electronic device may display "assistant manager KIM" 1353 and "assistant manager PARK" 1355 which can transmit a message on the display unit 152. The electronic device may transmit a message to a dialog window selected among "assistant manager KIM" 1353 and "assistant manager PARK" 1355.

As described above, respective means for displaying a plurality of dialog windows and then transmitting a message input to a dialog window to at least one dialog window in an electronic device are provided. The respective means for displaying a plurality of dialog windows and then transmitting a message input to a dialog window to at least one dialog window in the electronic device may be configured using one means.

Figure 12:
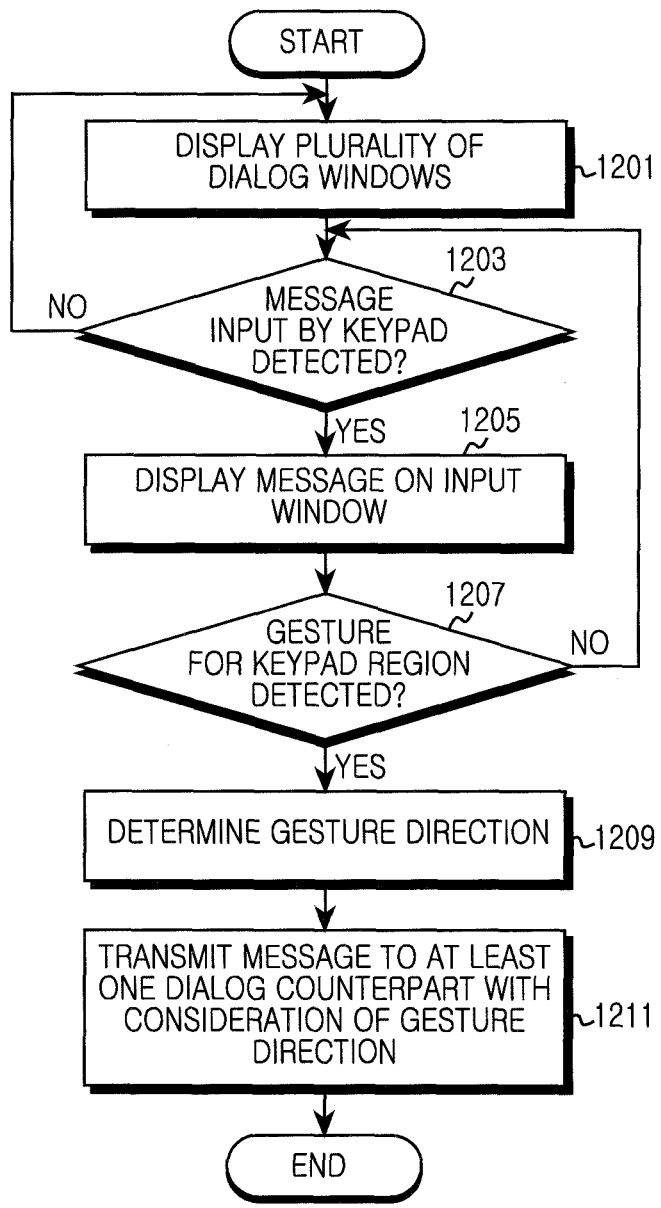
FIG. 12 is a flowchart illustrating a procedure for transmitting a message input to a dialog window to at least one dialog window in an electronic device displaying a plurality of dialog windows according to an exemplary embodiment of the present invention.

FIG. 12 illustrates a procedure for transmitting a message input to a dialog window to at least one dialog window in an electronic device displaying a plurality of dialog windows according to an exemplary embodiment of the present invention.

Referring to FIG. 12, the electronic device displays a plurality of dialog windows in step 1201. For example, the electronic device displays a first dialog window 1303 of "assistant manager KIM" 1301 and a second dialog window 1307 of "assistant manager PARK" 1305 as illustrated in FIG. 13A. Additionally, the electronic device may display application names 1309 and 1317, application icons 1311 and 1315, and messages 1313 and 1319. The electronic device may execute a message application to display a dialog window on the display unit 152. The electronic device may also obtain display data from a message application to display message content of the dialog window via the integrated message program.

After displaying the plurality of dialog windows, the electronic device determines whether a message input via the keypad is detected in step 1203. For example, the electronic device determines whether a touch is detected on the region of the keypad 1321 displayed on the display unit 152 as illustrated in FIG. 13A. The electronic device may determine whether a user's voice input is detected via the microphone 132.

When the message input via the keypad (or voice input) is detected, the electronic device displays a message on an input window in step 1205. For example, when detecting the message input via the keypad 1321 displayed on the display unit 152 as illustrated in FIG. 13A, the electronic device displays the message on the input window 1323. When detecting the user's voice input via the microphone 132, the electronic device may display a message on the input window 1323.

After displaying a message on the input window, the electronic device determines whether a gesture is detected in step 1207. For example, the electronic device determines whether a gesture for the keypad region is detected.

When the gesture is detected, the electronic device determines the direction of the detected gesture in step 1209.

After determining the direction of the gesture, the electronic device transmits messages to a dialog counterpart with consideration of the direction of the gesture in step 1211. For example, when detecting a drag moving from the first point 1331 to the second point 1333 as illustrated in FIG. 13B, the electronic device transmits the message of the input window 1323 illustrated in FIG. 13A to the second dialog window 1307 of "assistant manager PARK" 1305. Accordingly, the electronic device displays the transmitted message 1335 on the second dialog window 1307 of "assistant manager PARK" 1305 as illustrated in FIG. 13B.

When detecting a drag moving from the third point 1341 to the fourth point 1343 as illustrated in FIG. 13C, the electronic device may transmit the message of the input window illustrated in FIG. 13A to the first dialog window 1303 of "assistant manager KIM" 1301. Accordingly, the electronic device may display the transmitted message 1345 on the first dialog window 1303 of "assistant manager KIM" 1301 as illustrated in FIG. 13C.

When detecting a touch moving from the first point 1331 and the third point 1341 to the second point 1333 and the fourth point 1343 as illustrated in FIG. 13D, the electronic device may transmit the message of the input window 1323 illustrated in FIG. 13A to the second dialog window 1307 of "assistant manager PARK" 1305 and the first dialog window 1303 of "assistant manager KIM" 1301. Accordingly, the electronic device may display the transmitted messages 1335 and 1345 on the second dialog window 1307 of "assistant manager PARK" 1305 and the first dialog window 1303 of "assistant manager KIM" 1301 as illustrated in FIG. 13D.

When the "send" icon 1351 is selected as illustrated in FIG. 13E, the electronic device may display "assistant manager KIM" 1353 and "assistant manager PARK" 1355 which can transmit a message on the display unit 152. After that, the electronic device may transmit a message to a dialog window selected among "assistant manager KIM" 1353 and "assistant manager PARK" 1355.

After that, the electronic device ends the present algorithm.

In the above exemplary embodiments of the present invention, the electronic device determines a dialog window to which the electronic device will transmit a message with consideration of a gesture direction. According to another exemplary embodiment of the present invention, the electronic device may determine a dialog window to which the electronic device will transmit a message with consideration of a message transmission event including movement information of the electronic device, touch information, the number of button inputs, a button input duration time, etc. According to another embodiment of the present invention, the electronic device may determine a dialog window to which the electronic device will transmit a message depending on a user's voice instruction.

In the above exemplary embodiment of the present invention, the electronic device writes a message and then transmits the message to a selected dialog window. According to another exemplary embodiment of the present invention, the electronic device may select a dialog window and then transmit an input message to the selected dialog window.

As described above, the electronic device has an advantage of allowing a user of the electronic device to easily transmit/receive a message to a plurality of dialog windows by displaying the plurality of dialog windows and then transmitting the message input to an input window to at least one dialog window.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting/receiving a message in an electronic device, the method comprising:
   displaying a first dialog window executed by a first message program on the electronic device;
   receiving, while the first dialog window is displayed, an event for executing a second message program on the electronic device, the second message program different from the first message program;
   displaying the first dialog window, a second dialog window executed by the second message program, and an input window of a message integration program on the electronic device, wherein the message integration program is different from the first message program and the second message program;
   receiving a message input into the input window;
   receiving a single gesture for selecting at least one dialog window among the first dialog window and the second dialog window and for transmitting the received message to the selected dialog window or windows after the message is received, the single gesture being received on the input window; and
   selecting at least one dialog window among the first dialog window and the second dialog window based on a direction of the single gesture toward the first dialog window, the second dialog window, or to both the first dialog window and the second dialog window on the message integration program and transmitting the received message to the selected dialog window or windows,
   wherein the message integration program is configured to transmit the message, based on the single gesture, to a first user of the first message program via the first dialog window, to a second user of the second message program via the second dialog window, and to both the first user and the second user via the first dialog window and the second dialog window respectively,
   wherein the method further comprises:
   detecting a gesture on one of the first dialog window or the second dialog window, and changing a corresponding dialog window where the gesture has been detected to another dialog window based on a direction of the gesture for the corresponding dialog window; and
   detecting a gesture on both the first dialog window and the second dialog window, and scrolling a screen comprising the first dialog window and the second dialog window based on a direction of the gesture detected on the first dialog window and the second dialog window.

2. The method of claim 1, wherein the displaying of the first dialog window and the second dialog window comprises:
   displaying the first dialog window for providing a first object and a message service using the first message program, when the second dialog window display event for providing a second object and a message service using the second message program occurs, reducing and displaying the first dialog window; and
   displaying the first dialog window and the second dialog window.

3. The method of claim 1, wherein the displaying of the first dialog window and the second dialog window comprises:
   obtaining display data from applications of the first dialog window and the second dialog window; and
   displaying the first dialog window and the second dialog window based on the display data.

4. The method of claim 1, further comprising:
   when a magnify event for one of the first dialog window and the second dialog window occurs, magnifying and displaying the corresponding dialog window,
   wherein when a reduce event for the corresponding magnified dialog window occurs, a process for displaying the first dialog window and the second dialog window is performed.

5. An electronic device comprising:
   at least one processor;
   at least one touchscreen;
   a memory; and
   at least one program stored in the memory and configured for being executable by the at least one processor,
   wherein the program comprises at least one instruction, which, when executed by the processor, causes the processor to perform a method including:
   displaying a first dialog window executed by a first message program on the electronic device,
   receiving, while the first dialog window is displayed, an event for executing a second message program on the electronic device, the second message program different from the first message program,
   displaying the first dialog window, a second dialog window executed by the second message program, and an input window of a message integration program on the electronic device, wherein the message integration program is different from the first message program and the second message program, receiving a message input into the input window displayed on the touchscreen, receiving a single gesture for selecting at least one dialog window among the first dialog window and the second dialog window and for transmitting the received message to the selected dialog window or windows after the message is received, the single gesture being received on the input window, and selecting at least one dialog window among the first dialog window and the second dialog window according to a direction of the single gesture toward the first dialog window, the second dialog window, or both the first dialog window and the second dialog window on the message integration program and transmitting the received message to the selected dialog window or windows, wherein the message integration program is configured to transmit the message, based on the single gesture, to a first user of the first message program via the first dialog window, to a second user of the second message program via the second dialog window, and to both the first user and the second user via the first dialog window and the second dialog window respectively, wherein the at least one processor further executes an instruction for:

detecting a gesture on one of the first dialog window or the second dialog window, and changing a corresponding dialog window where the gesture has been detected to another dialog window based on a direction of the gesture for the corresponding dialog window; and detecting a gesture on both the first dialog window and the second dialog window, and scrolling a screen comprising the first dialog window and the second dialog window based on a direction of the gesture detected on the first dialog window and the second dialog window.

6. The electronic device of claim 5, wherein an instruction for displaying the first dialog window and the second dialog window comprises:

displaying the first dialog window for providing a first object and a message service using the first message program, when the second dialog window display event for providing a second object and a message service using a second message program occurs, reducing and displaying the first dialog window; and displaying the first dialog window and the second dialog window.

7. The electronic device of claim 5, wherein the instruction for displaying the first dialog window and the second dialog window comprises:

obtaining display data from applications of the first dialog window and the second dialog window; and displaying the first dialog window and the second dialog window using the display data.

8. The electronic device of claim 5, wherein the at least one processor further executes an instruction for, when a magnify event for one of the first dialog window and the second dialog window occurs, magnifying and displaying the corresponding dialog window, and wherein when a reduce event for the corresponding magnified dialog window occurs, the first dialog window and the second dialog window are displayed.

* * * * *